United States Patent [19]

Hill et al.

[11] Patent Number: 5,127,103
[45] Date of Patent: Jun. 30, 1992

[54] REAL-TIME TRACING OF DYNAMIC LOCAL DATA IN HIGH LEVEL LANGUAGES IN THE PRESENCE OF PROCESS CONTEXT SWITCHES

[75] Inventors: Charles R. Hill, Peekskill; Fryderyk Tyra, Yonkers; Samuel O. Akiwumi-Assani, Beacon, all of N.Y.

[73] Assignee: North American Philips Corporation, New York, N.Y.

[21] Appl. No.: 616,723

[22] Filed: Nov. 16, 1990

Related U.S. Application Data

[63] Continuation of Ser. No. 108,832, Oct. 14, 1987, abandoned.

[51] Int. Cl.⁵ .............................................. G06F 11/00
[52] U.S. Cl. ..................... 395/575; 364/DIG. 1; 364/267; 364/267.4
[58] Field of Search ... 364/200 MS File, 900 MS File

[56] References Cited

U.S. PATENT DOCUMENTS

| | | | |
|---|---|---|---|
| 3,707,725 | 12/1972 | Dellheim | 364/200 |
| 4,189,234 | 4/1979 | Huber | 371/19 |
| 4,232,370 | 11/1980 | Tapley | 364/900 |
| 4,349,873 | 9/1982 | Gunter et al. | 364/200 |
| 4,462,077 | 7/1984 | York | 364/200 |
| 4,634,941 | 1/1987 | Suko | 364/200 |
| 4,636,940 | 1/1987 | Goodwin, Jr. | 364/200 |
| 4,720,778 | 1/1988 | Hall et al. | 364/200 |
| 4,819,233 | 4/1989 | Delucia et al. | 371/19 |
| 4,835,675 | 5/1989 | Kawai | 364/200 |
| 4,866,665 | 9/1989 | Haswell-Smith | 364/900 |
| 4,881,228 | 11/1989 | Shouda | 364/900 |
| 4,885,717 | 12/1989 | Beck et al. | 364/900 |

OTHER PUBLICATIONS

A. M. Chesir, *Real-Time High-Level Language Debugging System*, Jul. 1984, pp. 1-119 [thesis-Cooper Union].
M. Goosens, *Real-Time High-Level Language Debugging Tools*, Mar. 1985, pp. 5.1-5.66 [thesis-Free University of Brussels.].
European Patent Application 0189843; Filed Jan. 23, 1986 Hall et al-same as C above.
A. Aho & J. Ullman, *Principles of Compiler Design*, (Addison-Wesley 1977), pp. 6-7.
C. P. Geer et al., *Instruction Stream Trace*, IBM Technical Disclosure Bulletin, vol. 26, No. 11 Apr. 1984, pp. 6217-6220.
T. A. Hunt, *General Trace Facility*, IBM Technical Disclosure Bulletin, vol. 15, No. 8 Jan. 1973, pp. 2446-2448.
D. G. East et al., *Relocate and Multiprocessor Map and Trace Monitor*, IBM Tech. Dis. Bull., vol. 15, No. 4 Sep. 1972, pp. 1377-1378.

*Primary Examiner*—Joseph A. Popek
*Assistant Examiner*—Rebecca L. Rudolph
*Attorney, Agent, or Firm*—Anne E. Barschall

[57] ABSTRACT

An improved real-time debugger accommodates high level language computer programs containing dynamic local data and process context switches. Information thus acquired is used to deduce the stack frame pointer. Inputs and outputs of a target processor are tapped to capture key instructions, particularly indicating context switches. A local tag memory in the debugger stores images of stack frames during context switches.

30 Claims, 16 Drawing Sheets

REAL-TIME TRACING OF DYNAMIC LOCAL DATA IN HIGH LEVEL LANGUAGES IN THE PRESENCE OF PROCESS CONTEXT SWITCHES

This is a continuation of application Ser. No. 108,832, filed Oct. 14, 1987 now abandoned.

BACKGROUND OF THE INVENTION

The invention relates to real-time tracing of local data in order to debug real-time software on microprocessors. The debugger described is particularly useful where software is to be included in an embedded real-time microprocessor system that has a self-contained operating system. The correct functioning of such software depends on its time behavior. Some examples of such applications are robot manipulator and sensor systems, automatic process control systems, schematic test equipment, and disc drive interrupt software. In these systems, a programmer typically writes an application program on a development system and then downloads the program into a dedicated microprocessor.

The most common method of debugging is to trace the values of variables in a program during execution. Printouts of the trace then show the evolution of processing in the program. Most such traces are accomplished by putting print statements in the program. This procedure is cumbersome for the programmer. It also distorts the timing of the program, which prevents the debugging from showing true real-time performance.

One prior art system for debugging high level languages in real-time is disclosed in A. M. Chesir, "A Real-Time High-Level Language Debugging System", dissertation presented to the Cooper Union for the Advancement of Science and Art in July 1984 ("Chesir)". This dissertation appears as Appendix A to the present application. Appendix A is available in the patented file. A summary of this prior art reference is found in FIG. 1. In FIG. 1, a user 101 interacts with a host processor 103. The user enters a high level computer program source code representation into the host processor 103. In the host processor 103, the high level source code is compiled. The compiled high level source code is transmitted to a target processor 105. At the host processor 103, the user 101 indicates which global variables in his or her source code are to be traced during a run of the computer program. The debugger 107 traces data appearing on the pins of the target processor 105 by means of clamp-on probe 109. The clamp-on probe 109 transmits to the debugger 107 the values appearing on the pins of the target processor 105 in real-time. The running of the program on a target processor is not affected in any way.

Prior to running the program on the target processor 105, the user 101 selects global variables to be traced using the host processor 103. The tag table memory 113 keeps track of which global variables are to be traced. The trace buffer memory 115 keeps track of the values of those global variables during the running of the computer program. The debugger control processor 111 acts as an interface with the host processor 103. The decision logic 117 controls the collection of trace history while the target processor is running. For every bus cycle of the target processor 105, the decision logic 117 determines whether that cycle should be traced by using the information in the tag table memory 113 as a reference. If the cycle is to be traced then information from the pins of the target processor is transferred to the trace buffer memory 115.

The Chesir debugger only traced static variables. It is desirable to trace dynamic local data in programs as well.

An example of a high level language debugger which does trace dynamic local variables is in M. Goossens "Real-Time High-Level Language Debugging Tools", dissertation submitted to the Free University of Brussels in March of 1985. Like Chesir Goossens uses a tag table memory, but the tag table memory is adapted to local variables. The Goossens dissertation does not explain how to trace local data when there is a context switch. Goossens provides for tracing variables in several procedures at once. However, for each procedure which is added, the hardware increases substantially in complexity.

Another high level language debugger is disclosed in European Patent Application No. 86100895.1 "Method and Apparatus for Software Debugging." This debugger emulates the operation of the 68000 processor. Because of the emulation, certain real-time properties of the processor may be lost. In particular, the timing of certain events may be distorted. In addition, the European patent application does not allow for selection of particular variables to be traced, but instead traces variables within a range. Moreover, the European patent application does not indicate how to trace variables from more than one procedure.

The above described prior art therefore leaves open how to trace selected dynamic local data in real-time when there are process context switches; where a context switch is defined as a change in machine state for the purpose of suspending the currently running process and resuming another process. Such context switches can occur at arbitrary points within procedures.

SUMMARY OF THE INVENTION

It is therefore an object of the invention to provide an improved real-time debugger for computer programs containing local data.

It is a further object of the invention to provide a debugging aid for real-time software containing both dynamic local data and context switches.

It is still a further object of the invention to allow for tracing of dynamic local variables and parameters to procedures ("local data") in an increased number of procedures without unduly complicating the hardware.

It is another object of the invention to take advantage of standard features and instructions commonly available in compilers and microprocessors.

The above-mentioned objects of the invention are achieved by monitoring inputs to and outputs from the target processor and using the inputs and outputs to trace the dynamic local data in the presence of context switches.

The objects are further achieved by an apparatus which deduces a stack frame pointer from the inputs and outputs.

The objects are still further achieved by using a local tag memory which contains an image of a selection of dynamic local data to be traced.

The objects are yet still further achieved by using a segmented memory scheme to address the local tag memory.

The objects are also achieved by triggering capture of the stack frame pointer based on the presence, in the inputs and outputs of the target processor, of certain standard instructions.

BRIEF DESCRIPTION OF THE DRAWINGS

The invention will now be described by way of non-limiting example with reference to the following Figures:

FIG. 5b shows the stack frame during execution of the procedure main in the program of FIG. 5a.

FIG. 5c shows the stack frame during execution of the procedure add_ab in the program of FIG. 5a.

FIG. 9 shows the contents of the local tag memory for the program of FIG. 5a.

DETAILED DESCRIPTION OF THE PREFERRED EMBODIMENT

Introduction

The present invention takes advantages of certain standard features of high-level languages and of microprocessors. The examples given use the C language, standard C compiler and assembler techniques, and the Motorola 68000 microprocessor.

More information about compiler design can be found in A. Aho et al, *Principles of Compiler Design* (Addison-Wesley 1977). More information about the language C can be found in B. Kernighan et al., *The C Programming Language*, (Prentice-Hall 1978). More information about the Motorola 68000 can be found in *Motorola 68000 16-Bit Microprocessor User's Manual* (Prentice-Hall 1979).

It is noted that the invention is equally applicable to other ALGOL-like languages, like PASCAL, ALGOL, and structured BASIC and to other microprocessors like the INTEL 8086. These other languages and chips have the standard features which are used by the invention.

Data Types

The invention traces dynamic local data. Therefore an explanation follows of the concepts of local and global data and how C compilers generate assembly code to implement such data.

Data types in high-level languages can be divided into two major categories. These are static and dynamic data types. Static data exists in the same location in memory throughout the execution of a program. Dynamic data on the other hand, does not continuously exist in the same location during execution. It only exists during the activation of the procedure that the variable has been declared in.

The memory space for static data exists continuously during run-time. Since it is always in memory, it can be assigned a fixed location in a processor's address space. The variable can then be represented by the address of that fixed location. A variable that is global in scope is static and is accessible to any procedure in the program.

Figure 2A:
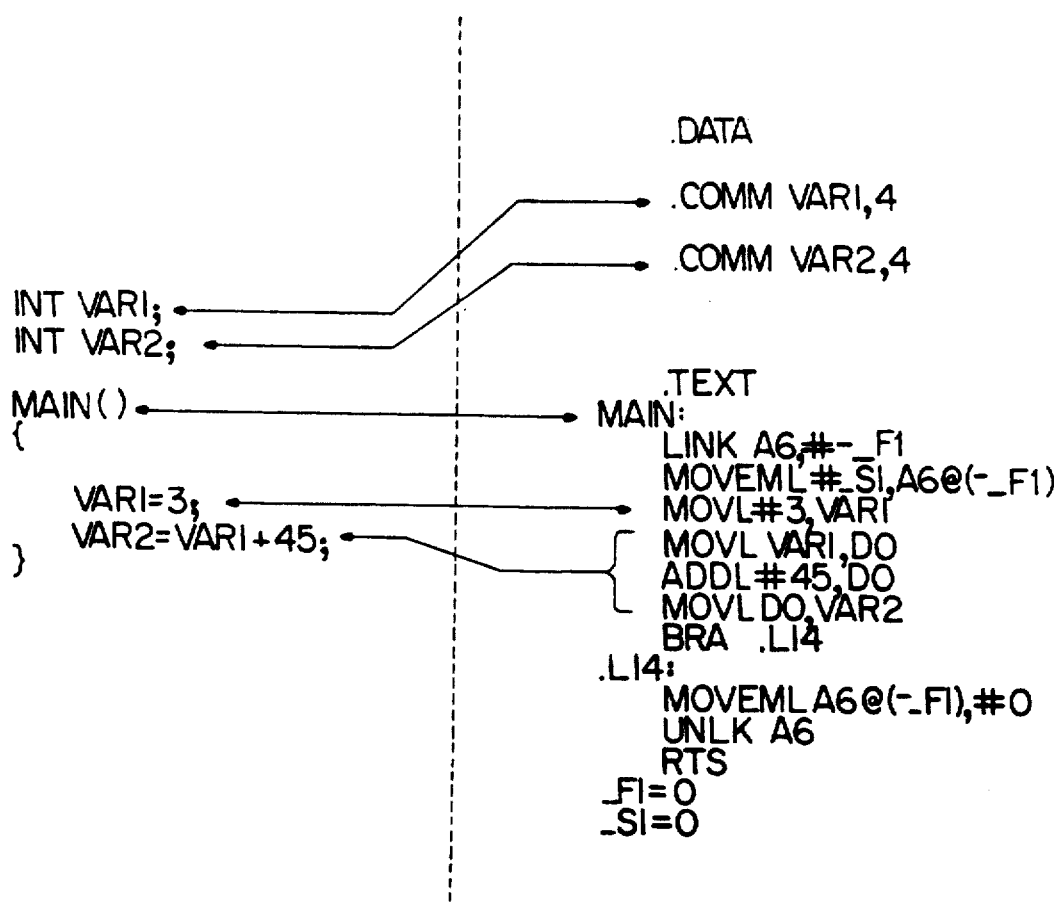
FIG. 2a shows a simple "C" program with global variables and the resulting 68000 assembler code produced by the compiler.

FIG. 2a shows an example of a C program with global variables. Adjacent to the C source code is a listing of the assembly code produced by the C compiler. The arrows show the correspondence between the source statements and the assembly code produced. This is a simple program, but it is only intended to provide an example of variables. The simplicity of this program in no way indicates that this debugger system is limited to such programs.

In the example there are int variables, var1 and var2. Variables var1 and var2 are put in the common data segment of the memory. Whenever one of these variables is referenced by a statement, the absolute addresses of the variables are used. For example, in the statement var1=3, the assembler code generated moves the immediate operand #3 into the absolute address operand var1.

It is noted that since there are no local variables in this source code, the link operation does not allocate any space for local variables. Local variables and the link instruction in FIG. 2a are a6 and _F1, where _F1 is set to zero. Setting _F1 to zero indicates that no local variable space is to be allocated.

The moveml (Motorola mnemonic MOVEM.L) instruction in the assembly listing is for temporarily saving the contents of any registers that are used in this procedure. Note that the register mask operand _S1 is set to zero since there are no registers used during this procedure whose contents need to be saved. In this compiler, register d0 is available for use by a procedure. Hence its contents are not saved. Register d0 is used as a temporary storage register for "scratch pad" computation. Register a6 is used as the frame pointer and therefore is used as a base register from which to access local variables (and to save register values during procedure calls).

Figure 2B:
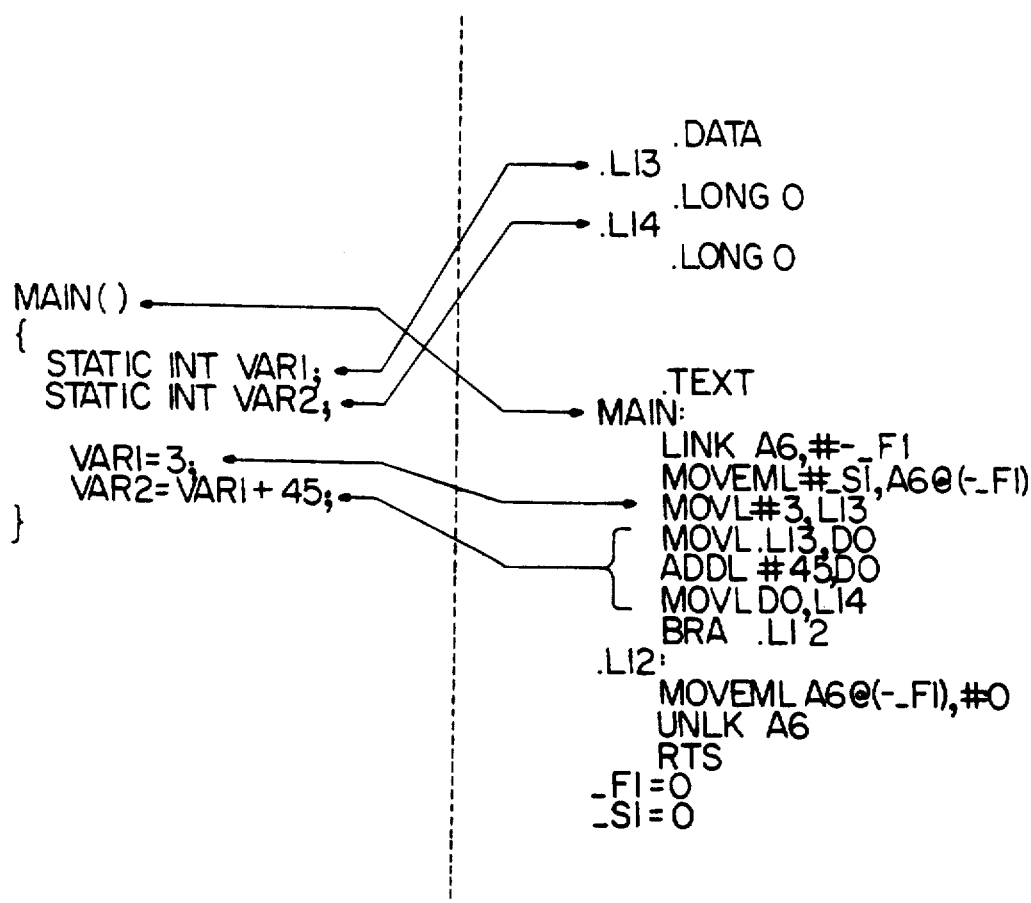
FIG. 2b shows a simple "C" program with static local the compiler.

FIG. 2b shows an example of the same program as the previous figure but this time with local static variables. Unlike a global variable, a static local variable is usually accessible to only one procedure. The only time a local static variable can be directly accessed is when the procedure in which it was declared is active. When that particular procedure is not active, the variable cannot be accessed but still exists in memory.

In FIG. 2b, variables var1 and var2 are put in the data segment, but are not declared common. Again, whenever a variable is accessed, the absolute address of the variable is provided as the operand to the assembly language instruction.

Since the absolute address is used to access these local static variables, the processor puts these addresses on its address lines to read and write to these locations in memory.

The local scope of these static variables does not complicate the data tracing hardware, because the variables are accessed from the memory of the target processor in the same way as the global static data. To trace these static variable accesses, debugger hardware can monitor the signals on the pins of the target processor. There is a direct one to one correspondence between the actual address value on the address bus and the variables. Each address value directly represents the corresponding variable. Local variables and arguments to procedures are more complicated as is explained in the sections following.

Figure 2C:
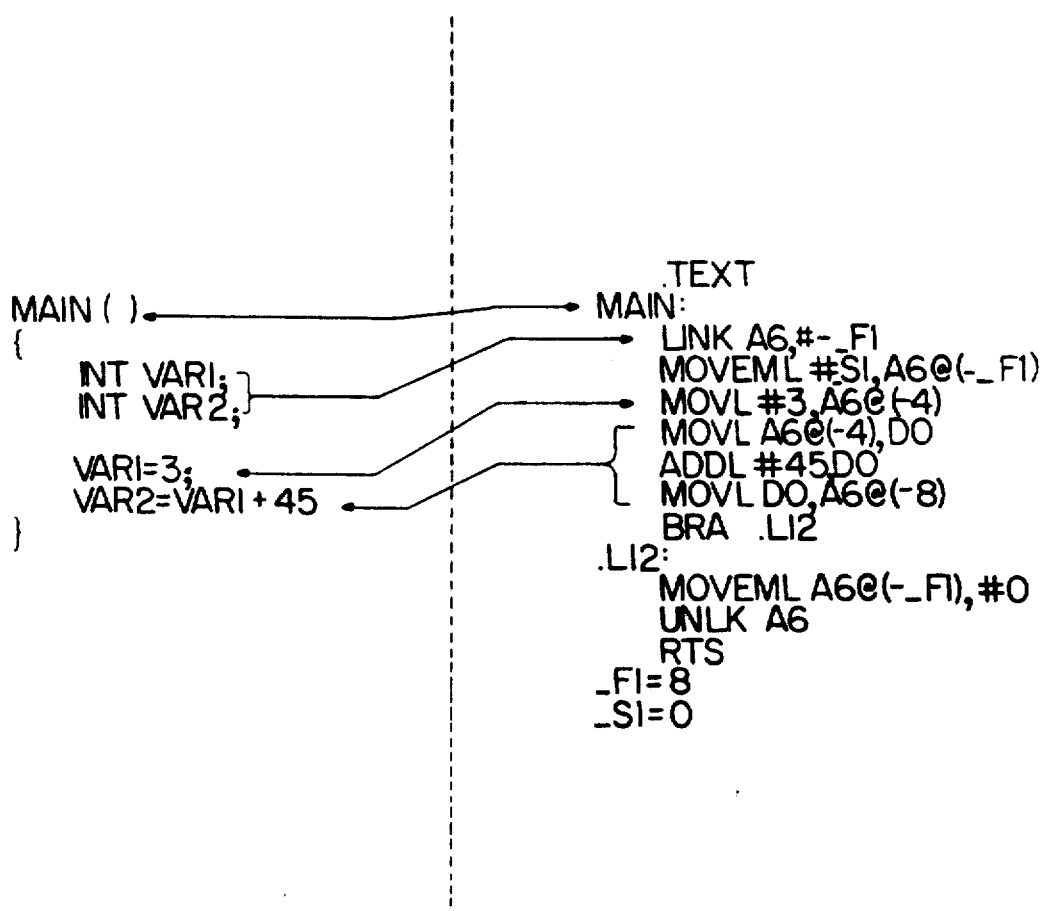
FIG. 2c shows a simple "C" program with dynamic local variables and the resulting 68000 assembler code produced by the compiler.

FIG. 2c illustrates compilation of a C program with dynamic data. Dynamic data does not continuously exist during runtime. It is only available to the currently active procedure (and sometimes to the procedures called by the current one). Once the current procedure finishes executing, the space allocated for its dynamic variables is freed. This allocation and subsequent release of space for dynamic variables is done to salvage memory space which is no longer needed.

Note that in FIG. 2c there is no data segment. All the variables exists on a stack only. Since a stack continuously grows up and down during program execution, the address of a particular variable is not fixed. The absolute address at which a local variable exists can change every time a procedure is invoked.

When the procedure is first entered, a link operation is performed. The link and unlink (Motorola mnemonic UNLK) instructions are special machine instructions of the Motorola 68000 family. Analogous instructions exist on competitive microcomputer chips. These instructions are particularly adapted to manage the calling and exiting of procedures.

One of the functions performed by the link instruction is to create a stack frame where dynamic data are stored. These data are then addressed using a stack frame pointer and an index. The stack frame pointer is an address of the top stack frame on the stack. The index is an offset to be added to the stack frame pointer to find the actual local variable. The stack frame pointer is stored in a register of the microprocessor. The specific register to be used is determined by the compiler. In most cases the register A6 is reserved for the stack frame pointer. Further discussion of the link instruction and of the stack frame will follow, when the actual hardware of the debugger is explained.

Since there are two int variables in the example of FIG. 2c, eight bytes must be set aside to hold these 32-bit integers. Therefore operand _F1 is set to 8. After the stack frame is created, the variables can be accessed using the frame pointer. For example, in the statement var1=3, the operand to the movl instruction is a6@(−4). This tells the 68000 to take the value of the frame pointer a6 and add −4 to it to get the address in memory where the variable exists.

It is noted that the offset is negative. This is done because the 68000 has a stack that normally "grows down". This means that a push onto the stack will eventually decrement the value in the stack pointer. Register a7 is normally used as the stack pointer in the 68000. When a procedure call is made the return address is pushed onto the stack by the jsr instruction. Since the stack is "growing down", the space allocated for local variables is below the return address. The operand to the link instruction is actually negative (in this case −8). When the stack frame is "built", the stack "grows down". The processor uses an offset of −8 from the current value of the frame pointer in order to access var2.

As can be seen from the above discussion, there is no fixed absolute address that these local variables reside at. Consequently, debugger hardware must figure out which variable the procedure is accessing by reverse indexing. The debugger must keep track of the value of the current stack pointer. Also, since different procedures have different variables with correspondingly different offsets, the debugger must keep track of what procedure is currently being executed. Using this knowledge, the debugger can then take values off the address lines during a data access and figure out which local variable is being accessed.

The same problem of keeping track of which procedure is running is further complicated in a multiprocess environment. Whenever a different procedure starts running or a context switch occurs the debugger must figure out which procedure it is. A detailed explanation of how the debugger accomplishes the above functions follows.

Overview of the Preferred Embodiment

Figure 3:
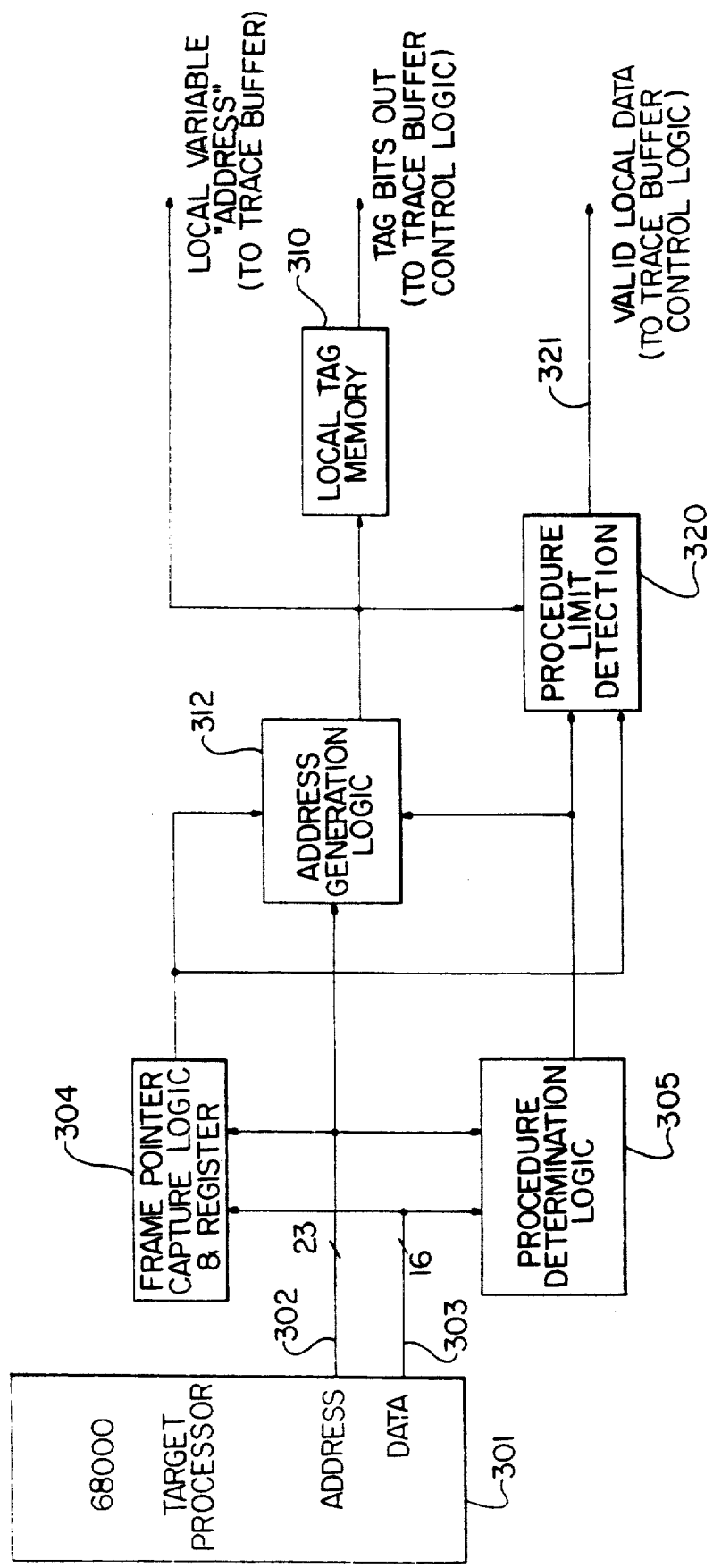
FIG. 3 is a block diagram of the preferred embodiment invention.

FIG. 3 is a simplified block diagram of the preferred embodiment of the invention. The target processor is shown at 301. The target processor has two output buses, an address bus 302 and a data bus 303. These buses 302 and 303 are tapped by the clamp 109 which is attached to the pins of the target processor 301. The clamp and pins are not shown in FIG. 3. A frame pointer is captured and stored at 304, based on signals from the target processor.

Procedure determination logic 305 determines whether a current instruction fetch address, appearing on the address bus 302 is within a procedure. Address generation logic 312 uses the address captured from the target processor 301 by box 304, and the procedure identification outputs from box 305 to address the tag memory 310. The output of the tag memory 310 indicates whether the values addressed are to be traced. It is noted that the local tag memory 310 is not the same as the global tag memory 113.

Box 320 does a boundary check on the address specified for the tag memory 310.

Box 304 has additional inputs, not shown, which will be explained below in section 6.

The preferred embodiment uses apparatus developed by Chesir, see Appendix A. Relevant details of Appendix A will be explained below. Appendix A is available in the patented file.

Summary of Relevant Details of the Prior Art

This summary section sets forth relevant details of Appendix A, available in the patented file along with a few improvements which were necessary to implement the preferred embodiment.

Host Processor

The host 103 is the processor that the user 101 interacts with. In the preferred embodiment, a SUN II workstation is used as the host processor 103. It contains all the special higher level software that is needed to enable the user to communicate effectively with the debugger control processor 111. The host 103 communicates with the debugger control processor through a high speed link 120 (e.g. an IKON DRV-11W parallel interface).

After a debugging session, the contents of the trace buffer memory 115 are transferred to the host processor 103. The host 103 processes the trace buffer memory 115 contents after a trace operation is performed and displays the trace results juxtaposed with the original source code that is being debugged. This display shows when the tagged statements were executed, and also when the tagged variables were accessed. An example of this display is shown in Appendix B, available in the patented file. It is noted that Appendix B shows output of the present invention, not of the prior art. Thus, while the present invention uses the same display unit as the prior art, the output is generally different.

Debugger Control Processor

The Debugger Control Processor 111 controls the various sections of the debugger. It is an intelligent interface between the host processor 103 and the debugger 107.

The controller 111 is needed to coordinate all the tasks that the debugger 107 has to perform. It controls the operation of the various hardware components of the debugger and in particular:

a) the loading of the tag table 113 and various registers; and b) the transfer of trace history from the trace buffer memory 115 to the host 103.

In the preferred embodiment, the controller 111 is a 68000 based microprocessor board with a MultiBus interface.

Global Tag Table Memory

The global tag table memory 113 indicates whether a particular memory location associated with an instruction or a static, or global variable accessed by the processor 105 is to be traced. It is also used to solve a prefetch problem described below.

To get the value of the tag table bits from the global tag table memory 113, the address bus 302 of the target processor 105 drives the tag table memory address lines (17 bits wide in this implementation). Whenever the target processor 105 accesses its memory (not shown), the tag table memory 113 of the debugging system uses the address lines 302 of the target processor 105 to look up the tag bits. These tag bits are then sent to the Decision Logic 117.

The global tag memory table memory 113 consists of 128K words each 4 bits wide. These four bits along with their descriptions are shown in Table I. The first of the four bits is called the basic block bit. It is used to resolve a problem that occurs when tracing instruction execution in processors that have instruction prefetching queues. The second bit, the want bit is used to indicate whether a particular memory access is to be traced. The third bit is the write/read bit and is used during data traces only. If this bit is set, it indicates that both data reads and data writes are to be traced. If it is not set, it indicates that only data writes are to be traced. The fourth bit is to be used in future expansions of the debugging system that might need such a bit. One such use for this bit may be for the implementation of a breakpoint capability.

TABLE I

| \multicolumn{2}{c}{Format of 4-bit Tag Word} | |
|---|---|
| Bit Position | Description |
| 3 | Basic Block Bit |
| 2 | Want Bit |
| 1 | Write/Read |
| 0 | for future use |

The first bit in the global tag table memory 113, the basic block bit, will now be explained in detail.

The 68000 microprocessor has a one word prefetch queue. The prefetch mechanism makes the tracing of instruction execution more complicated. Not only is the time of actual instruction execution harder to determine, but the execution of the instruction fetched is not guaranteed. The basic block bit in the tag table memory is used to alleviate this problem.

A basic block is defined as a block of instructions in a program that has exactly one entry and one exit point. An instruction that is the target of a branch or which follows a branch begins a basic block. The first instruction in this block is tagged (by putting a 1 in the global tag table memory 113 in the basic block bit column at the address). The rest of the instructions in this block are not tagged. An example of this is shown in the Table II. The middle column in the figure shows the instructions contained in the target processor's memory. The last column shows the value of the Basic Block Bits that are in the tag table memory of the debugger for the particular address locations indicated in the first column.

TABLE II

| \multicolumn{3}{c}{Example of Basic Block Bits} | | |
|---|---|---|
| Address Location | Instruction | Basic Block Bit |
| 300 | beq 310 | 0 |
| 302 | mov | 1 |
| 304 | add | 0 |
| 306 | sub | 0 |
| 308 | bne 302 | 0 |
| 310 | shr | 1 |
| 312 | nop | 0 |
| 314 | rol | 0 |

With these basic block bits the debugger can determine if a particular instruction that has been fetched is actually being executed. The sequence of basic block bits that occurs while the target processor is running is what determines if an instruction has actually been executed.

Table II shows a portion of a program in which a prefetch complicates data tracing. For example, if the processor is fetching the instruction in location 306, then the basic block bit for that location is not set. While the processor is executing this sub instruction it prefetches the next instruction with the basic block bit being a 0 again (bne at address 308). The processor starts executing the bne instruction after it finishes the sub instruction. Now, while it is executing this instruction, it prefetches the shr instruction in location 310. This time the basic block bit is set. If the bne instruction does not cause a branch, then the prefetched instruction is now executed. If the branch was taken, however, then the processor would have discarded the shr instruction in the queue and performed a fetch at location 302. The instruction at location 310, shr, is the one that may or may not be executed even though it has been fetched.

With the basic block bits, however, we can tell which is the case. Notice that if the instruction in location 310 was executed, the next instruction to be fetched has a basic block bit of 0 (location 312 nop). If the instruction at location 310 was not executed then the next instruction fetch by the processor has a basic block bit of 1. Therefore, to determine if an instruction is executed, the debugger waits to see the basic block bit of the next instruction fetched. Consequently, the debugger has to delay its decision by one instruction fetch.

The basic block bit is also used as an indication that an instruction word being fetched contains the operation code of the instruction, if the operation code is a link, unlink, or moveml. The operation code is in the first word of an instruction.

The global tag table 113 is generated from the compilation of the source code for the target processor 105 and from a selection by the user 101 of variables to be traced. To generate this table, the debugging system 107 extracts information from the assembly code and symbol table generated by the compiler on the host processor 103. This enables the debugger 107 to generate the 4-bit wide tag table with the beginnings of basic blocks tagged with a 1. The rest of each basic block is tagged with a 0. The debugger 107 also generates the other three bits in the global tag table memory 113 (the want bit, the write/read bit, and the spare bit mentioned before). The user 101 tells the debugger 107 which statements and variables are to be traced via the host processor 103. The debugger 107 then generates the appropriate tag table 113. The tag bits are set for the machine code instructions and data locations that correspond to the statements and variables to be traced. For a more thorough discussion of the tag table the reader is referred to Appendix A.

Trace Buffer Memory

When an instruction or static data is accessed by the target processor 105 the debugging system 107 will check via the tag table 113 and 310 to see if that access, which directly corresponds to a unique physical address location in the target processor's memory (not shown), is to be traced. If it is, then the memory location and the time, relative to the time the program started running, is recorded in a buffer memory 115 in the debugging system 107. The buffer 115 is where all the traced information is stored, until it can be uploaded to the host 103 to be examined by the user 101.

If a location is to be traced, and it is accessed in an instruction fetch, the address of the location is sent to the trace buffer memory 115 along with the time the location was accessed, encoded in a 48-bit wide word. The format of this word is shown in Table III. The left column in the figure shows the bit position in the word and the right column shows what the bit is used for.

TABLE III

| Format of 48-bit Instruction Trace Word | |
|---|---|
| Bit Position | Description |
| 47 | CPU FC0 |
| 30-46 | CPU Address Lines A1-A17 |

TABLE III-continued

| Format of 48-bit Instruction Trace Word | |
|---|---|
| Bit Position | Description |
| 0-29 | Timer Value |

If a location is to be traced, and if it is accessed as part of a data fetch or write, then the address of the location accessed is sent to the trace buffer memory 115. Table IV shows the format of the 48-bit wide word used for data accesses. The left column shows the bit position and the right column indicates the use of the bit. Most of the above features as described were present in the prior art system of Appendix A, available in the patented file. The Collision Bit and the Local/Global Data Bit were not originally in Chesir's prior art debugger system. Appendix A, available in the patented file. They were added in order to support local data tracing.

TABLE IV

| Format of 48-bit Data Trace Word | |
|---|---|
| Bit Position | Description |
| 47 | CPU FC0 |
| 30-46 | Address |
| 28-29 | for future use |
| 27 | Collision Bit |
| 26 | Local/Global Data Bit |
| 19-25 | for future use |
| 18 | CPU Upper Data Strobe |
| 17 | CPU Lower Data Strobe |
| 16 | CPU Read/Write |
| 0-15 | CPU Data Lines D0-D15 |

Figure 7:
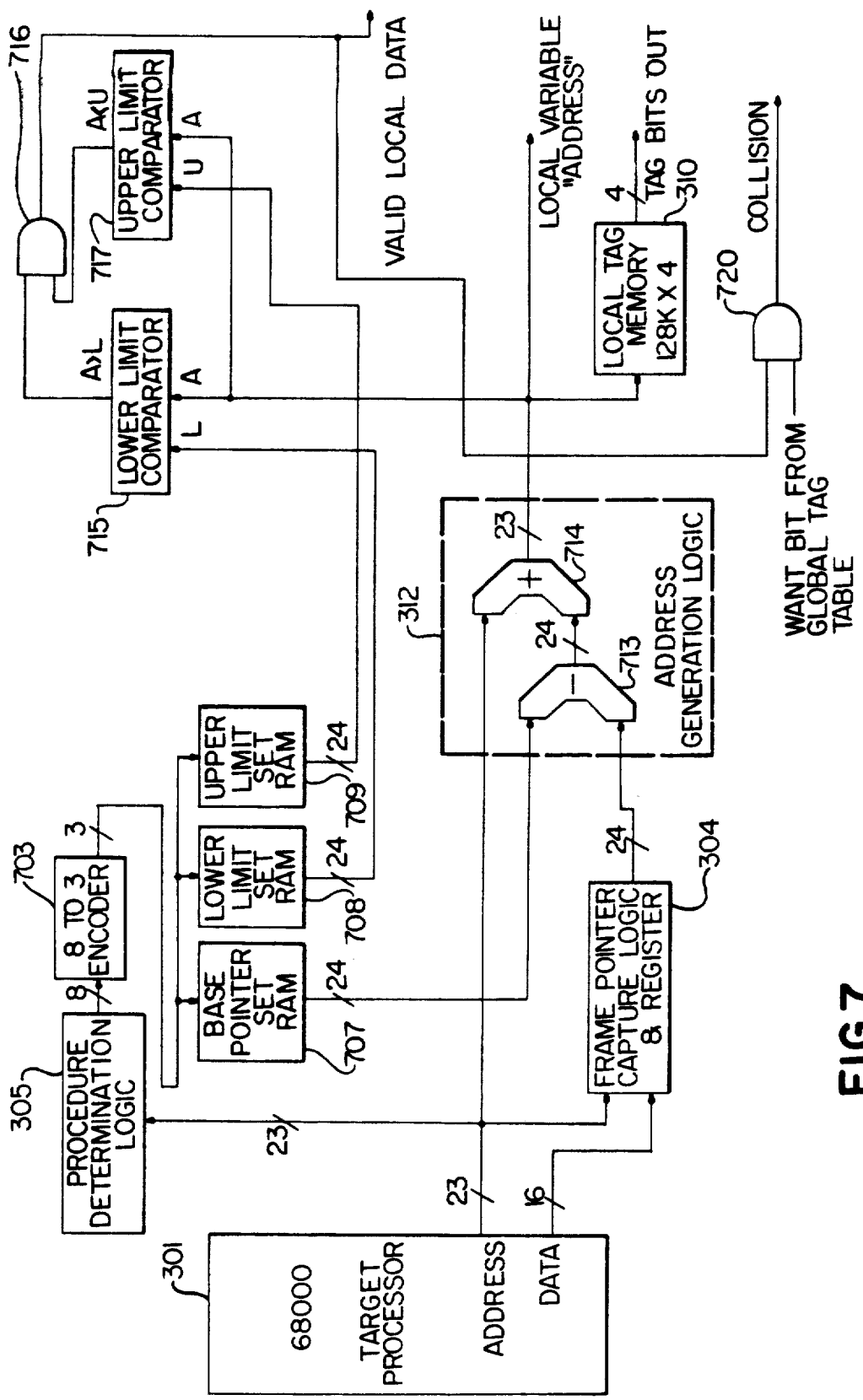
FIG. 7 is a more detailed block diagram of the preferred embodiment.

The Collision Bit is used to indicate that a local data access was made to a region of the target CPU's memory that was designated to be used only for global data. This kind of access typically occurs when the stack in the program being debugged overflows. This collision bit is set if both the Local Data Valid Signal 321 is set and the want bit in the global tag memory 113 (described in Table I) is set for a particular access. The computation of the collision bit is illustrated in FIG. 7, where it is the output of AND gate 720. The Local/Global Data Bit indicates whether the data trace was a local data access or a global data access. The value of this bit is determined by the Local Data Valid signal 321. When the Local/Global data bit is clear, bits 30-46 contain CPU Address Lines A1-A17. When Local/Global is set, bits 30-46 contain values encoding the procedure number to which the local datum belongs and its offset within the Stack frame.

While the target processor 105 is executing instructions in real-time, the instruction fetches and data references occur too fast and in too large a volume to be recorded by any existing static memory at reasonable cost and density. For example, a 68000 microprocessor operating at 10 MHz can fetch instructions or access data at up to a rate of 2.5 million words per second (400 ns. per fetch). Since the buffer memory is large (128K×48 bits) the preferred way to achieve low cost and high density is to use dynamic RAM. Since this kind of RAM is relatively slow and needs refreshing, a way of buffering the trace information is needed before it is actually sent to the buffer memory (dynamic RAM). This is accomplished with a FIFO buffer 122 that allows the transfer of data between two asynchronous systems.

When a trace is to be recorded in the buffer memory 115, the information is first put into the FIFO 122 (64 words deep × 48 bits wide in the implementation). The FIFO 122 then acts as a synchronous memory but with two non-related strobes, one for input and one for output. The FIFO 122 buffers the trace information from the target processor to the dynamic RAM. In a performance test of the hardware of Appendix A, available in the patented file, it has been found that the preferred FIFO 122 never overflows and in fact never gets close to overflowing.

Decision Logic and Timer

The Decision Logic 117 controls the collection of the trace history while the target processor 105 is running. For every bus cycle of the target processor, the Decision Logic determines whether that cycle should be traced. This logic looks at the tag bits from memory 113 for the particular address being accessed by the target processor and makes a decision whether to trace. If the Decision Logic 117 determines that a trace of a bus cycle is to be done, then the logic sends a strobe out to the FIFO 122 to signal it to capture the state of the target processor's busses and control lines. This state is then stored in the Trace Buffer Memory 115.

The Timer 117 is used to generate a time stamp for the trace history. The preferred timer has a resolution of five microseconds. When a bus cycle is captured in the trace memory, the value of the timer is stored along with the state of the processors busses and control lines. The reader is referred to Appendix A, available in the patented file, for a more thorough discussion of the Decision Logic and Timer.

Relevant Details of the Target Processor

The registers of a microprocessor are typically used to store data and/or addresses of data in memory. These registers provide fast access to data that is in heavy use. This form of accessing is called implied addressing.

The debugger hardware directly monitors the address and data pins of the microprocessor chip, consequently, there is no way to get direct access to the internal registers.

Registered variables will have to be forced to reside in memory locations if they are to be traced.

Some microprocessors have internal cache memories to speed accesses to data and instructions. There is usually no access to a cache via the pins on a microprocessor. Therefore it is difficult to trace the contents of the cache. As a result the cache should be disabled during tracing.

Addressing Modes

Addressing modes of microprocessors have to be considered when tracing data because they indicate the method used to get access to variables in memory. The most common and basic forms of addressing modes used with variables in memory are direct, indirect, and indexed. These modes are discussed below, along with the corresponding methods of tracing variables.

The direct addressing mode is used in global and static local data accesses. The addresses of these types of variables are known at compile or link time, and therefore can be directly incorporated in the instructions of the generated code. The processor puts the addresses of these variables on the address bus and then reads and writes to the corresponding locations in memory. This is a simple form of addressing that makes the task of tracing variables relatively easy. All the debugger has to do is to put the value of the microprocessor's address bus in its trace memory (trace history) when it is tracing these kinds of variables. This value directly indicates which variable was accessed during the execution of the code.

Indirect addressing is similar to direct addressing in that the address value put on the address bus lines is also a direct indication of which variable is being accessed. The difference between direct and indirect is in the source of the address value. The source in indirect addressing (assuming one level of indirection) is a register. The value of this register is used as the address of a variable in memory. Since this value is put on the address bus during the data access, there is no extra work involved on the part of the debugger. It simply treats the variable in the same way as it did with direct addressing (as described above).

Indirect addressing is often used to implement stacks in microprocessors. A register is used as a pointer (stack pointer) to an area in memory reserved for the stack. With this pointer, data can be pushed onto and popped off of the stack. Every time an operation is performed on the stack, the pointer is updated to point to the top of the stack.

Indexed addressing is used for addressing local variables in compilers. This is the kind of addressing that the local data tracing hardware must be able to process. In this form of addressing, one of the microprocessor's registers is used as a base pointer to memory. During run-time, an index is added to the value in this register to get the actual address of a local variable memory. The value of the index is determined and fixed during the compilation of the source code. Different local variables have different indices in their respective procedures. This form of addressing makes possible the use of stack frames in compilers.

Stack frames were first introduced in Section 2 and will be further discussed below. For the MC68000, compilers generate link and unlink instructions to create and remove stack frames.

Link and Unlink Instructions

Figure 5A:
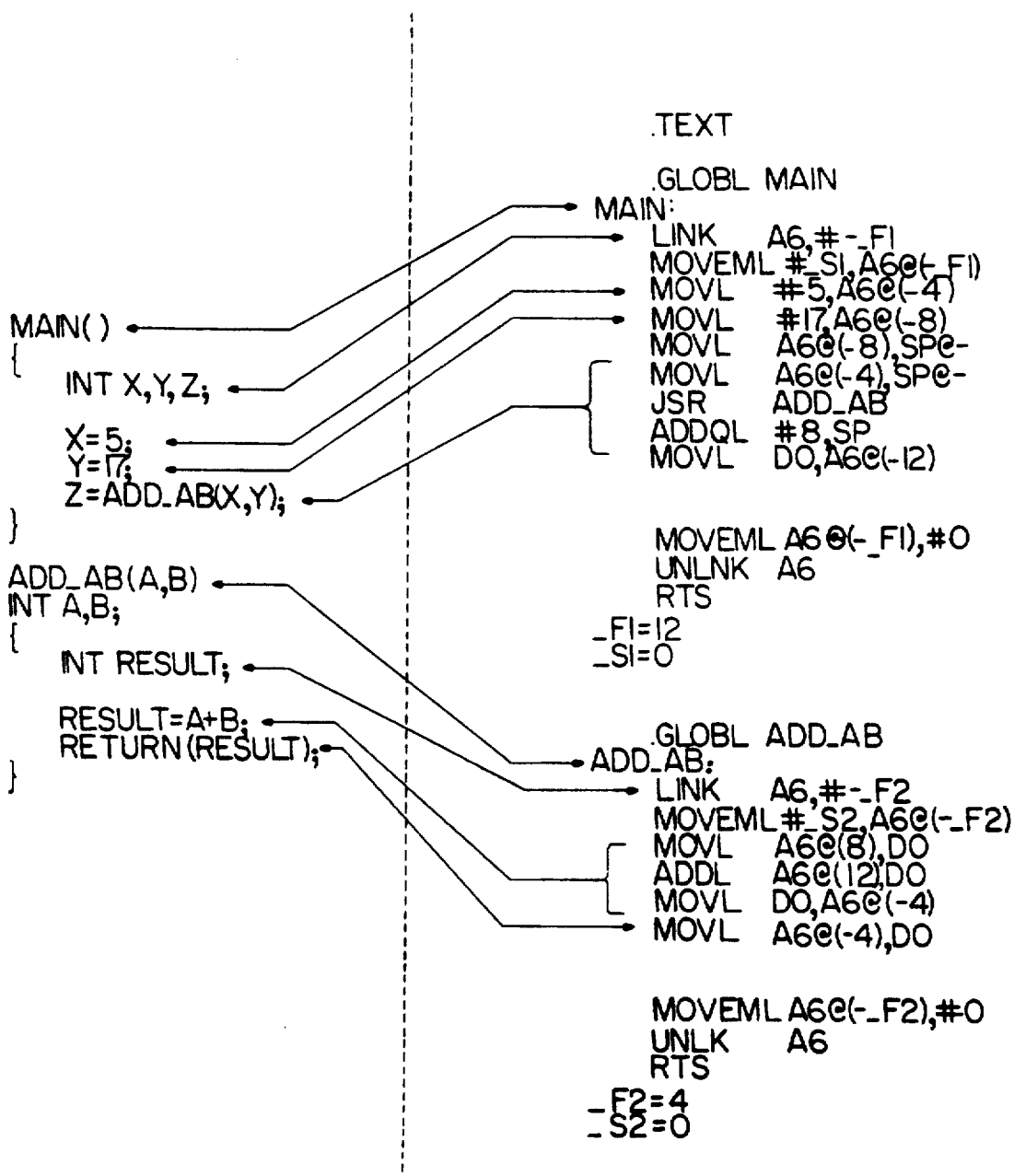
FIG. 5a shows a simple "C" program with dynamic local variables in a procedure and the resulting 68000 assembler code produced by the compiler.
Figure 5B:
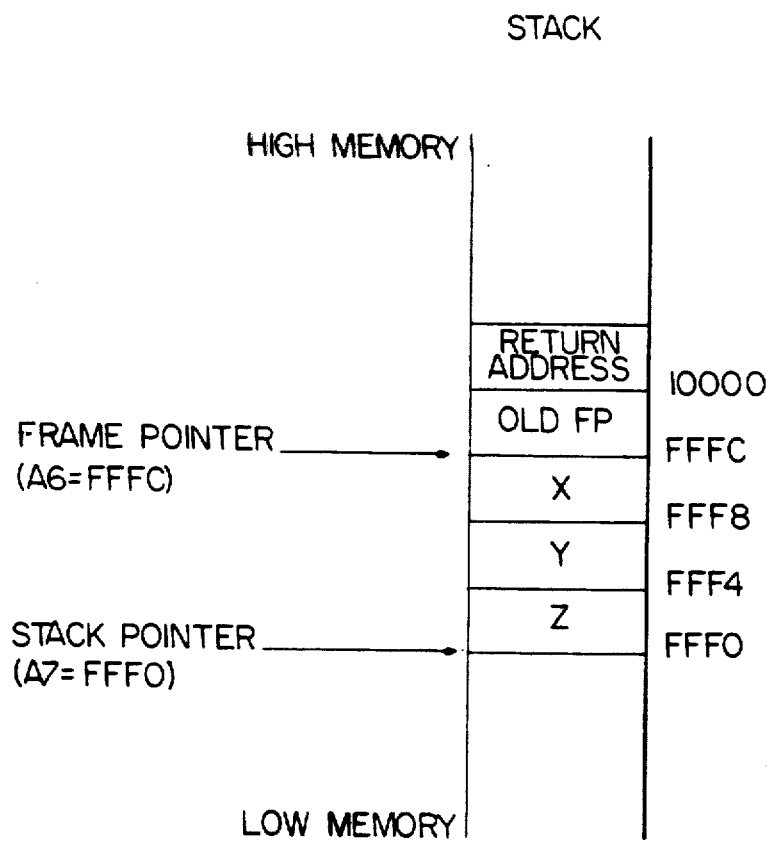
Figure 5C:
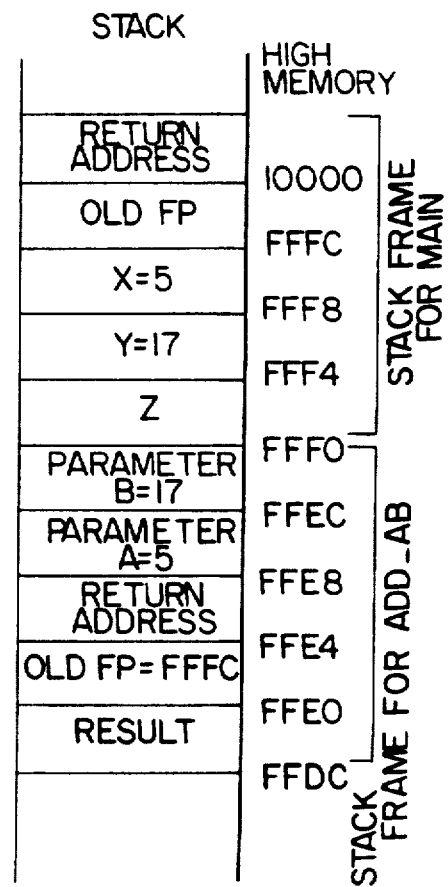

An illustration of how the link and unlink instructions work appears in FIGS. 5a-5c.

In FIG. 5a, function main has three local variables: x, y and z. Function add_ab has one local variable: result. There are two parameters (arguments) passed to function add_ab by function main: a and b. Function add_ab also returns a value: result. This value is passed back to the calling function main via register d0 in the 68000 register set. The next few paragraphs will show what the stack frame looks like during the execution of this program.

FIG. 5b shows what the stack looks like after the link instruction is executed in routine main (FIG. 5a). The addresses are listed on the right side of the column. These addresses are put in FIG. 5b to make the calculation of the offsets easier to see. The return address in the stack at location 10000 is the address that the microprocessor will return to after the main routine is finished. This return address is put onto the stack by the jsr that called the main routine. Space is allocated on the stack for the old FP (old frame pointer), and variables x, y, and z by the link instruction in routine main.

When the z=add_ab(x,y) statement is executed, the parameters and returns address are pushed onto the stack as shown in FIG. 5c. The two parameters to the procedure add_ab are pushed into locations FFEC and FFE8 by the movl a6@(−8),sp@-and movl a6@(−4),sp@-instructions. The return address is pushed into location FFE4 by the jsr add_ab instruction. This return address is the address of the addql #8,sp instruction in the assembly listing.

The way the stack looks after the link instruction in procedure add_ab is completed is shown in FIG. 5c. The value of the old FP at location FFE0 is the previous value of the frame pointer (FFFC).

As can be seen from the assembly code and from the stack frame diagram, offsets to get access to parameters are positive (above the frame pointer). Offsets to get access to local variables are negative (below the frame pointer). For example, the movl a6@(8),d0 instruction in procedure add_ab loads the value of parameter a into d0. This is an example of indexed addressing used to get a parameter from the stack frame. The current value of the frame pointer (a6) is FFE0 in FIG. 5c. The index of 8 is added to FFE0 to get the address of parameter a, FFE8.

The movl a6@(−4),d0 instruction in procedure add_ab loads the value of local variable result into d0. This instruction is an example of using indexed addressing to get access to a local variable. Adding −4 to the current value of the frame pointer produces the address FFDC which is where result currently resides.

When procedure add_ab finishes executing, the stack frame for it is "unlinked". This unlink operation is performed by the unlk instruction in add_ab. The rts instruction at the end of add_ab pops the return address off of the stack. Then the addql #8,sp instruction in main de-allocates the space for the parameters After this addql instruction the stack frame looks again like the one shown in FIG. 5b.

Context Switches Through Moveml Instructions

A context switch is defined as a change in machine state for the purpose of suspending the currently running process and resuming another process. The machine state includes the value of the cpu registers, including the frame pointer and stack pointer registers. (Since each process has its own stack, the stack and FP registers are in general different for each process). A context switch can occur at arbitrary points within procedures; it can be triggered by an interrupt that makes a higher priority process (than the current process) ready for execution, or by an explicit operating system call that causes the current process to suspend.

To correctly trace the local data of procedure calls, the value of the frame pointer must be tracked. Since the frame pointer is part of the process state, it can change as a result of context switches as well as procedure calls. In the preferred embodiment, it is assumed that context switches are always effected by a moveml instruction, since that is the most efficient way to change the contents of a number of registers. For increased generality, we do not assume that context switches always take place at one location in the operating system code, because an operating system may use straight-line code in many different places for efficiency reasons. Therefore the occurrence of a moveml instruction that changes the framepointer must be detected during program execution. (Alternatively, if the target processor does not have an instruction to save a number of registers (such as moveml), an instruction that restores a single register (such as movel) would be detected when that instruction restored the framepointer). Also for generality, the hardware does not assume a particular register for the framepointer, its value is set with switches S10, S11, S12.

Frame Pointer Capture Logic

Figure 4:
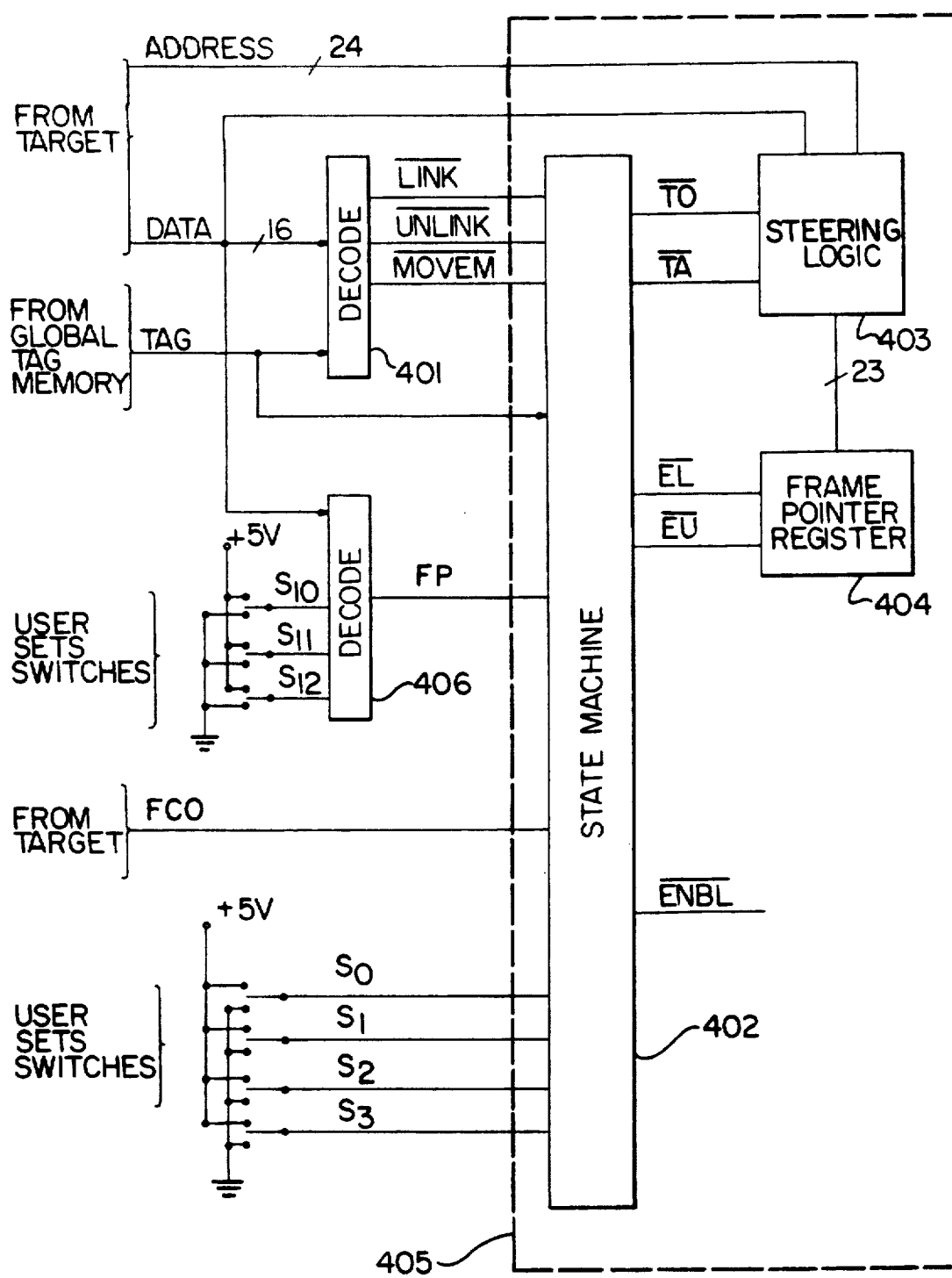
FIG. 4 is a block diagram of the frame pointer capture logic.

FIG. 4 is a block diagram of the frame pointer capture logic. Box 401 decodes data signals from the target processor and the tag line from the global tag memory. From these signals the decoder 401 produces the lines which are labeled $\overline{\text{link}}$, $\overline{\text{unlink}}$, $\overline{\text{movem}}$. When the $\overline{\text{link}}$ line is low, a link instruction has been detected at the target processor. When the $\overline{\text{unlink}}$ line is low, an unlink instruction has been detected at the target processor. When the $\overline{\text{movem}}$ line is low, a moveml instruction has been detected at the target processor. Box 401 is a Programmable Array Logic. It does a simple comparison of the values on the data lines with the machine language representations of the link, unlink, and moveml instructions as well as checking to see that the basic block bit, TAG is set for that instruction. This additional use of TAG guarantees that the instruction word being examined is indeed the start of a new instruction and not just the data portion of an instruction. The data portion of an instruction may resemble one of the three operation codes link, unlink, and moveml.

Box 406 has inputs $S_{10}$, $S_{11}$, and $S_{12}$ and also the signals on the data lines from the target processor 105. $S_{10}$, $S_{11}$, and $S_{12}$ are set manually by DIP switches on the debugger 107. (Alternatively they could be stored automatically in a register, loaded by software which interacts with the compiler on the target processor 105.) $S_{10}$, $S_{11}$, and $S_{12}$ represent bits of a binary number which specifies which register the compiler uses for the frame pointer. In the case of the "C" compiler used in the preferred embodiment, register a6 is used for the frame pointer. Therefore the values of $S_{10}$, $S_{11}$, and $S_{12}$ are respectively 1, 1, and 0. The combinatorial logic of decoder 406 then compares the settings of $S_{10}$, $S_{11}$, and $S_{12}$ with values appearing on the data bus. If the settings of $S_{10}$, $S_{11}$, and $S_{12}$ match the register reference on the data bus, then the output FP of box 406 will be high.

The four outputs of boxes 401 and 406 are fed to a state machine 402. The state machine also has inputs: FC0 which comes from the target processor; tag which comes from the global tag memory; and a 4-bit input S0, S1, S2, and S3 which comes from a DIP switch. FC0 is value readable from a pin of the target processor. When the FC0 line is low, the data lines of the target processor contain an instruction. When the FC0 line is high, the data lines of the target processor contain data.

When the line labelled tag is high ,an instruction call is part of a prefetch only and should be ignored. The line labelled tag is determined by the value of the basic block bit in the global tag memory.

S0, S1, S2, and S3 represent a four bit binary number which is the number of fetches in a moveml instruction which occur before the frame pointer register is moved. This number depends on the mask described below with respect to the moveml instruction. S0, S1, S2, and S3 are set manually by DIP switches on the debugger 107. (Alternatively they could be stored automatically in a register, loaded by software which interacts with the compiler on the host processor 103.)

The state machine 402 has five outputs, $\overline{\text{TD}}$, $\overline{\text{TA}}$, $\overline{\text{EL}}$, $\overline{\text{EU}}$, and $\overline{\text{ENABL}}$. $\overline{\text{TD}}$ and $\overline{\text{TA}}$ are input to the steering logic 403. Steering logic 403 also has as inputs the signals from the address and data lines of the 68000. $\overline{EL}$ and $\overline{EU}$ are input to the frame pointer register 404 along with a 23-bit output from the steering logic 403. The frame pointer register 404 has a 24 bit output at which a frame pointer value is provided. The signal $\overline{ENBL}$ indicates whether the output of the frame pointer register 404 is a valid frame pointer.

The operation of the decoder 401 will now be explained. One function of the decoder 401 is to detect the presence of the link and unlink instructions. These instructions are significant because they are present at the beginning and ending of procedures and are central to the maintenance of the stack frame.

Another function performed by the decoder 401 is to detect the moveml instruction. The moveml instruction is significant because it is present at context switches.

Figure 8A:
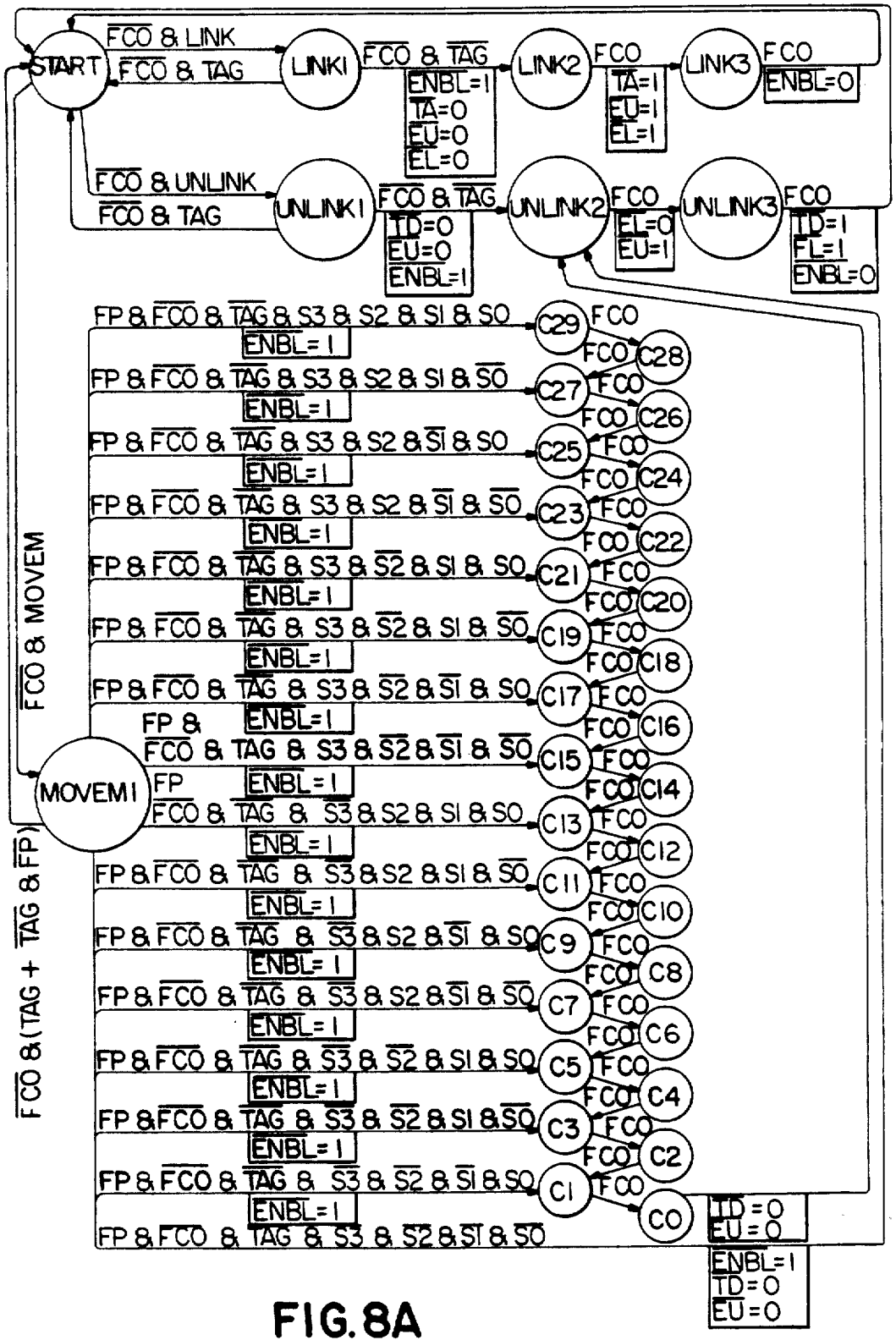
FIG. 8a is a state diagram for the state machine in the frame pointer capture logic.
Figure 8B:
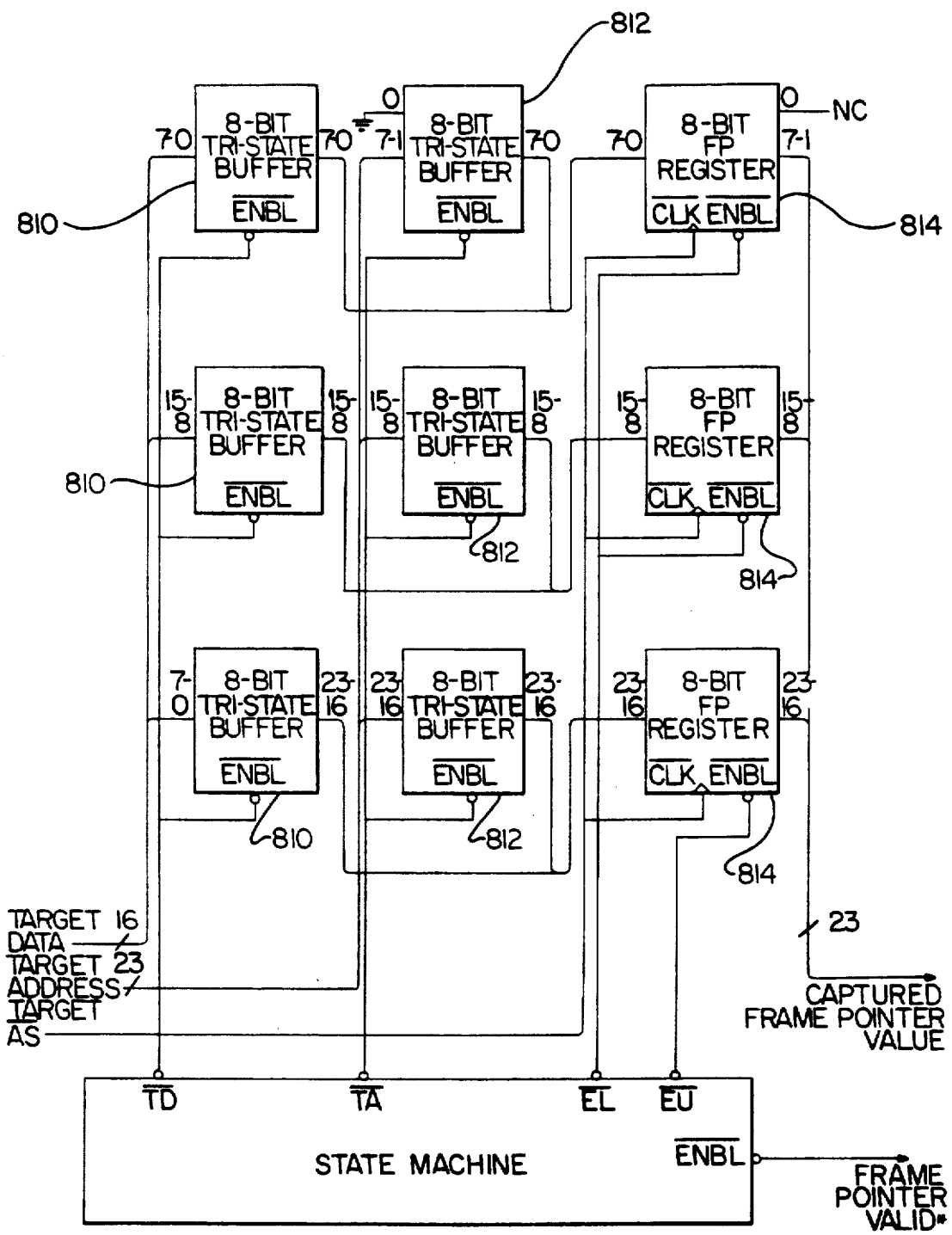
FIG. 8b is a more detailed diagram of part of the frame pointer capture logic.

The details of the components shown in FIG. 4 as dotted box 405 are further illustrated in FIGS. 8a and 8b.

State Machine

FIG. 8a is a state diagram which illustrates the operation of the state machine 402. Any commercially available state machine may be used, for instance the Field Programmable Logic Sequencer (Signetics 82S105A). In the notation in FIG. 8a, the conditions for reaching a state are written above an input line to the state. Outputs from the state machine are written in boxes below the input lines to the states.

How the state diagram of FIG. 8a was derived will now be discussed. The derivation is shown for each of the three 68000 instructions involved in updating the frame pointer, i.e. LINK, UNLINK, and MOVEML. These state sequences were derived for the Motorola 68000 microprocessor specifically. A similar derivation would be done if this debugger system were to be redesigned for a microprocessor with a different instruction set.

The LINK instruction state sequence in the state diagram was derived by examining the functional specifications and operation of this instruction. The LINK instruction performs the following operations upon execution.

An →SP@-; SP →An ; SP+d →SP

This indicates that the LINK instruction first pushes the current frame pointer. An, on the stack, using the predecrement mode. The stack pointer, SP, is then copied into the frame pointer register, An. The value in the frame pointer register is now the current frame pointer. An offset, d, is then added to the stack pointer register, SP. This offset is the size of the stack space allocated for the current procedure's local variables.

As can be seen from the LINK instruction specification, the new frame pointer register value that will be loaded into An is available on the address bus lines of the CPU when the old frame pointer value is saved on the stack. Hence, the value of the new frame pointer can be captured by latching the value of the address bus when the 68000 performs the first data access after the execution of the LINK instruction commences.

Since the 68000 has a one word prefetch queue, the determination of whether the LINK instruction is actually going to be executed depends on the Basic Block bit of the instruction word fetched after the LINK instruction fetch. The LINK instruction will be executed if the Basic Block bit of the instruction fetch after the LINK instruction fetch is a 0. A discussion as to how the Basic Block bit is used to determine execution of a prefetched instruction will be presented below.

From this analysis, the state sequence can be described as follows:
state START:

--- if ($\overline{FCO}$ & LINK) then go to state LINK1;
state LINK1: /*LINK has been fetched*/ if ($\overline{FCO}$ & $\overline{TAG}$ ) then:

$\overline{ENBL}$ = 1;

$\overline{TA}$ = 0;

$\overline{EU}$ = 0;

$\overline{EL}$ = 0; and
        go to state LINK2;

else if ($\overline{FCO}$ & TAG) then go to state START;
state LINK2: /*LINK being executed*/
    if (FCO) then $\overline{TA}$ = 1;

$\overline{EU}$ = 1;

$\overline{EL}$ = 1;
        latch CPU address lines into debugger's
          frame pointer register;
        and
        go to state LINK3;
state LINK3:
    if (FCO) then:

$\overline{ENBL}$ = 0; and
        go to state START;

TAG represents the value of the Basic Block bit

---

This state description is shown in state diagram form in the upper most part of FIG. 8a, beginning with the START and LINK1 state.

The UNLINK instruction state sequence was derived from the following instruction specification in the 68000 user's manual:

An →SP ; SP@+ →An

This implies that the value of the frame pointer register, An, is copied into the stack pointer, SP. This effectively de-allocates the local variable data space from the stack for the currently exiting procedure. The frame pointer register is then changed back to point to the previous stack frame by popping (postincrement mode) the pointer off of the stack and putting it into the frame pointer register, An.

The operation of the UNLINK instruction indicates that the frame pointer value can be taken from the CPU data lines when the frame pointer is popped off of the stack. This requires the state machine to get the frame pointer value in two steps. First the upper byte must be latched and then the lower byte.

The Basic Block bit is used here in the same way it was used in the state sequence for the LINK instruction described above. The sequence continues with the capture of the frame pointer only if the Basic Block bit is 0 for the instruction fetch after the UNLINK instruction is fetched.

This analysis leads to the following state sequence for the UNLINK instruction.
state START:

--- if ($\overline{FCO}$ & UNLINK) then go to state UNLINK1;
state UNLINK1: /*UNLINK has been fetched*/

```
if (FCO & TAG) then:

TD = 0

EU = 0;

ENBL = 1; and
go to state UNLINK2;

else if (FCO & TAG) then:

EL = 0;

EU = 1; and
    go to state START;
state UNLINK2:           /*UNLINK being executed*/
    if (FCO) then:

EL = 0;

EU = 1;
        latch CPU data lines into the upper byte
            of debugger's frame pointer register; and
        go to state UNLINK3;
state UNLINK3:
    if (FCO) then:

TD = 1;

EL = 1;

ENBL = 0;
        latch CPU data lines into the
        lower byte
            of debugger's frame pointer
            register; and
        go to state START;
```

The state diagram form of this state description is shown in the middle part of FIG. 8a, beginning with the START and UNLINK1 state.

The state sequence for the MOVEML instruction was derived from the following instruction specification:

(Source) →Registers

This instruction saves and loads the 68000's registers according to the bits set in a mask field. Only the loading the registers from memory is what is of concern here. The saving of the registers in memory does not affect the frame pointer register. This mask is a 16-bit word that follows the MOVEML instruction word. The MOVEML instruction loads only those registers whose bits are set to 1 in the mask field.

The MOVEML instruction may or may not change the value of the frame pointer register. This register will be loaded if the particular bit is set in the mask. Therefore, part of the state sequence must know if the corresponding bit is set. In the state diagram of FIG. 8a, this input to the state machine is called FP.

For example, if register a6 is used in a particular compiler to hold the frame pointer, then the DIP switches, S12, S11, S10, are set to 1,1,0, respectively (i.e. 6 in decimal notation). The most commonly used address register for frame pointers in 68000C compilers is register a6. In the state machine, the FP input signal indicates whether the register mask read from the memory will modify the address register designated as the frame pointer. The FP signal does this by simply checking if the bit indicated by the DIP switch settings is set in the register mask. If the bit is not set, then the state machine treats the MOVEM instruction as if it were prefetched but not executed, i.e.—the state machine resets to its initial state. If the frame pointer bit in the mask was set, then the state machine goes to one of sixteen states. The particular state that it goes to depends upon the setting of another set of DIP switches, S3, S2, S1, S0, which are discussed below.

The MOVEML instruction moves a block of registers at a time and therefore at most two of the data cycles are of any relevance. These two cycles correspond to the lower and upper word of the frame pointer, just as in the UNLINK sequence described above. The other data cycles on the bus have to be ignored. This is what the second set of DIP switches S3, S2, S1, S0, are used for. The number that these DIP switches are set to indicates how many pairs of data cycles are to be ignored before the frame pointer register gets modified. This can be anywhere from zero to fifteen. The data cycles occur in pairs since the registers are thirty-two bits wide and the data bus is only sixteen. For example, if the compiler and operating system chosen uses the following register mask for context switches:

0100100100111000 where the register mask bit ordering is (as specified in the *Motorola 68000 16-Bit Microprocessor User's Manual* (Prentice-Hall 1979):

[a7,a6,a5,a4,a3,a2,a1,a0,d7,d6,d5,d4,d3,d2,d1]

and the frame pointer has been designated, via the first set of DIP switches, S12, S11, S10, described above, to be a6, then the number of data bus cycles to be discarded would be ten. Note that a 1 in any of the register mask's bits indicates that the corresponding register is to be loaded with a new value from memory. Note that when registers are loaded from memory, the order of loading is from right to left in the above mask bit ordering, i.e. register d1 is the first register loaded and register a7 is the last, assuming their corresponding bits are set in the mask.

Ten data bus cycles are ignored because five registers values are loaded from memory before the frame pointer register is loaded, i.e.—d3, d4, d5, a0, and a3 are loaded before a6 is loaded. Therefore, the number to be keyed into the DIP switches, S3, S2, S1, S0, is 0,1,0,1, respectively (i.e. 5 in decimal notation).

Once the proper number of data cycles is counted and ignored, the state sequence captures the new frame pointer value in the same way as the UNLINK instruction sequence.

The prefetch of the MOVEML instruction is handled in the same way as the LINK and UNLINK instruction prefetches, as describe above. If the Basic Block bit is not set to 1 and the mask indicates that the frame pointer register, An, is being updated, then the state machine continues with its capture of the frame pointer.

The state machine counts the data fetches that are discarded with a counter implemented as part of the state machine. This counter sequence consists of a set of count down states, C29 through C0, as shown in FIG. 5—5.

From this analysis, the following state sequence was arrived at:

```
state START:

if (FCO & MOVEML) then go to state MOVEML;
state MOVEML:           /*MOVEML has been fetched*/ if (FCO & TAG & FP&S3¹&S2&S1&S0) then:

ENBL = 1; and
        go to state C29;

else if (FCO&TAG&FP&S3&S2&S1&SW0) then:
```

```
            ENBL = 1; and
            go to state C27;
    else if (FCO&TAG&FP&S3&S2&S1&S0) then:
            ENBL = 1; and
            go to state C25;
    else if (FCO&TAG&FP&S3&S2&S1&S0) then:
            ENBL = 1; and
            go to state C23;
    else if (FCO&TAG&FP&S3&S2&S1&S0) then:
            ENBL = 1; and
            go to state C21;
    else if (FCO&TAG&FP&S3&S2&S1&S0) then:
            ENBL = 1; and
            go to state C19;
    else if (FCO&TAG&FP&S3&S2&S1&S0) then:
            ENBL = 1; and
            go to state C17;
    else if (FCO&TAG&FP&S3&S2&S1&S0) then:
            ENBL = 1; and
            go to state C15;
    else if (FCO&TAG&FP&S3&S2&S1&S0) then:
            ENBL = 1; and
            go to state C13;
    else if (FCO&TAG&FP&S3&S2&S1&S0) then:
            ENBL = 1; and
            go to state C11;
    else if (FCO&TAG&FP&S3&S2&S1&S0) then:
            ENBL = 1; and
            go to state C9;
    else if (FCO&TAG&FP&S3&S2&S1&S0) then:
            ENBL = 1; and
            go to state C7;
    else if (FCO&TAG&FP&S3&S2&S1&S0) then:
            ENBL = 1; and
            go to state C5;
    else if (FCO&TAG&FP&S3&S2&S1&S0) then:
            ENBL = 1; and
            go to state C3;
    else if (FCO&TAG&FP&S3&S2&S1&S0) then:
            ENBL = 1; and
            go to state C1;
    else if (FCO&TAG&FP&S3&S2&S1&S0) then:
            ENBL = 1;
            ED = 0;
            EU = 0; and
            go to state UNLINK2;
    else if (FCO&TAG) #(FCO & TAG &FP) then:
            ENBL = 1; and
            go to state START;
state C29:
            if (FCO) then go to state C28;
state C28:
            if (FCO) then go to state C27;
state C27:
            if (FCO) then go to state C26;
state C26:
            if (FCO) then go to state C25;
state C25:
            if (FCO) then go to state C24;
state C24:
            if (FCO) then go to state C23;
state C23:
            if (FCO) then go to state C22;
state C22:
            if (FCO) then go to state C21;
state C21:
            if (FCO) then go to state C20;
state C20:
            if (FCO) then go to state C19;
state C19:
            if (FCO) then go to state C18;
state C18:
            if (FCO) then go to state C17;
state C17:
            if (FCO) then go to state C16;
state C16:
            if (FCO) then go to state C15;
state C15:
            if (FCO) then go to state C14;
state C14:
            if (FCO) then go to state C13;
state C13:
            if (FCO) then go to state C12;
state C12:
            if (FCO) then go to state C11;
state C11:
            if (FCO) then go to state C10;
state C10:
            if (FCO) then go to state C9;
stte C9:
            if (FCO) then go to state C8;
state C8:
            if (FCO) then go to state C7;
state C7:
            if (FCO) then go to state C6;
state C6:
            if (FCO) then go to state C5;
state C5:
            if (FCO) then go to state C4;
state C4:
            if (FCO) then go to state C3;
state C3:
            if (FCO) then go to state C2;
state C2:
            if (FCO) then go to state C1;
state C1:
            if (FCO) then go to state C0;
state C0:
            if (FCO) then:
                TD = 0
                EU = 0; and
                go to state UNLINK2;
state UNLINK2:          /*MOVEML being executed*/
            if (FCO) then:
                EL = 0;
                EU = 1;
                latch CPU data lines into the upper byte
                  of debugger's frame pointer register; and
                go to state UNLINK3;
state UNLINK3:
            if (FCO) then:
                TD = 1;
                EL = 1;
                ENBL = 0;
                latch CPU data lines into the lower byte
                  of debugger's frame pointer register; and
                go to state START;
```

[1] S3 through S0 are the binary DIP switch settings that indicate how many data fetches are to be ignored The state diagram for this state description is shown in the lower portion of FIG. 8a, beginning with the START and MOVEML state. Note that states UNLINK2 and UNLINK3 are used for the last two states since they have the same functionality as the last two states in the state description derived for the UNLINK instruction. This was done to minimize the complexity of the state machine.

Steering Logic and Frame Pointer Register

FIG. 8b shows box 405 with more details of the steering logic and the frame pointer register.

The steering logic includes six 8-bit tri-state buffers. One set of buffers 810 is enabled by line $\overline{TD}$ from the state machine to take data off the data bus of the target processor. Another set of buffers 812 is enabled by line $\overline{TA}$ to take an address off the address bus of the target processor.

The frame pointer register 814 includes three 8-bit registers. It is enabled by lines $\overline{EL}$ and $\overline{EU}$ to take data from one of the two sets of buffers in the steering logic.

Procedure Determination Logic

Figure 6:
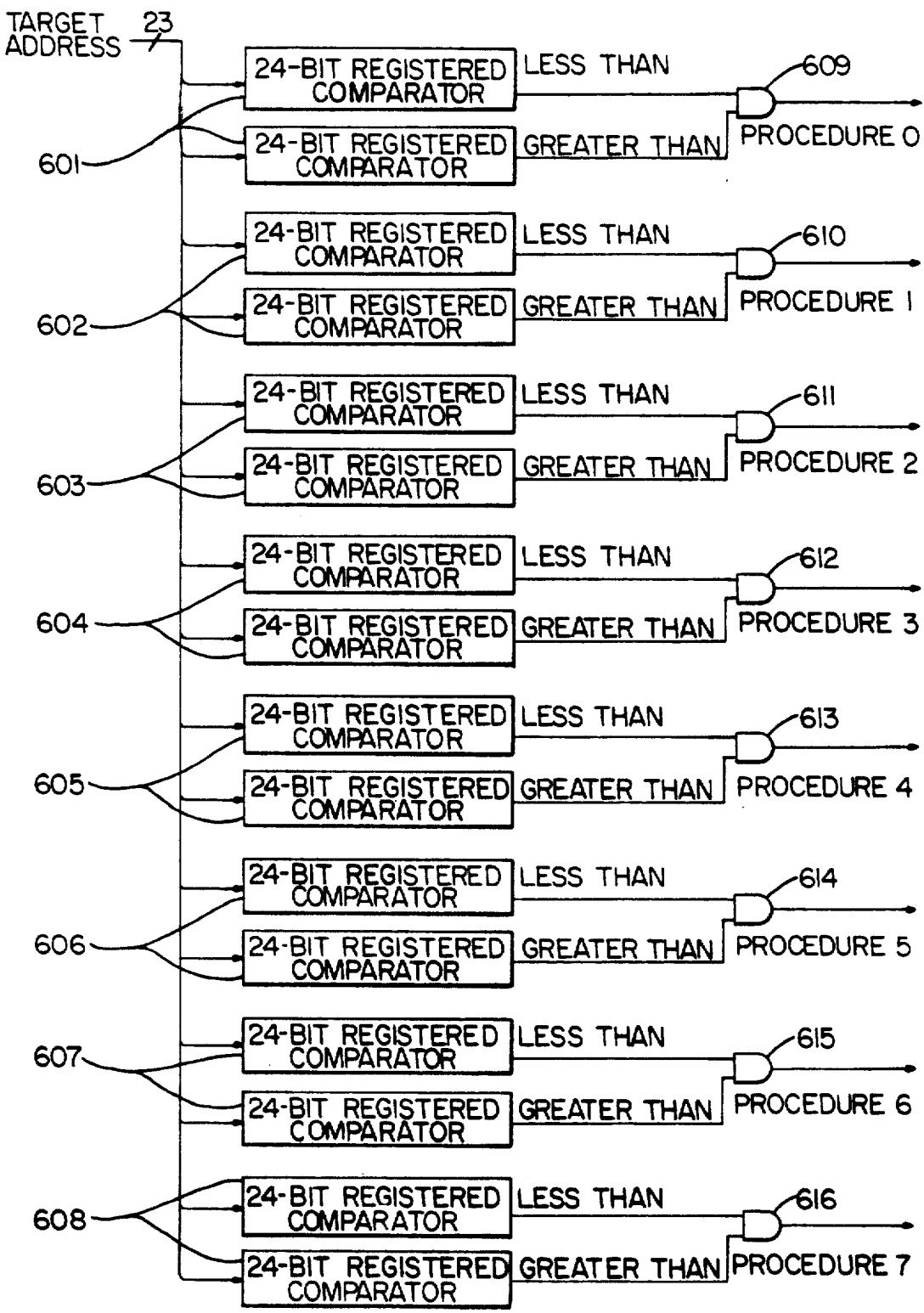
FIG. 6 is a block diagram of the procedure determination logic.

FIG. 6 is a detailed view of the procedure determination logic 304 of FIG. 3. The input to the procedure determination logic is the 23-bit instruction address read from the address bus of the target processor. This address is fed into eight pairs of 24-bit registered comparators 601, 602, 603, 604, 605, 606, 607, 608. Each pair of 24-bit registered comparators corresponds to a respective one of eight possible procedures. The illustrated embodiment has chosen a maximum of eight procedures in which local variables are to be traced. This is thought to be enough for most applications. However, one skilled in the art will have no difficulty in adding registered comparators, if it is desired to trace variables in more procedures.

The first register in each pair of registered comparators compares the input address with a lower bound address of the respective procedure's object code. The second register in each pair of registered comparators compares the input address with an upper bound address of the respective procedure's object code. The registered comparators 601, 602, 603, 604, 605, 606, 607, and 608 are loaded from data derived from the compiler in the host processor via inputs which are not shown in the figure. The respective outputs of each pair of registered comparators are fed to inputs of respective AND gates 609, 610, 611, 612, 613, 614, 615, and 616. If the output of one of the AND gates 609, 610, 611, 612, 613, 614, 615, and 616 is high that indicates that the address on the address bus of the target processor is in the respective procedure.

The output of the procedure determination logic is then fed to the eight to three bit encoder 706 illustrated in FIG. 7. The three bit encoded version of this signal is then fed to the Procedure Limit Detection box 320 and to the address generation logic 312.

Address Generation and Procedure Limit Detection

The address generation logic 312 and the procedure limit detection box 320 are further described in FIG. 7. FIG. 7 is a version of FIG. 3 with a few details added.

An 8 to 3-bit encoder 706 is attached to the 8-bit output of the procedure determination logic 705. The 3-bit procedure identification then addresses three RAMs 707, 708 and 709. The base pointer set RAM 707 produces a 24-bit address pointing to the base for that procedure in the local tag memory 310.

In the address generation logic 312 the frame pointer captured in box 304 is subtracted from base pointer determined from RAM 707 in the subtracter 713. This difference is then added to a current address on the data bus of the target processor in the adder 714. An address output from 312 is input as an address to tag memory 310.

The lower limit set RAM 708 is addressed by the output of the encoder 706. The RAM 708 outputs a lower limit value o the addresses in the tag memory which correspond to the current procedure, identified by the procedure determination logic 305. This lower limit is compared in the comparator 715 with the address output by the address generation logic 312. The result of the comparison is transmitted to an input of AND gate 716.

The upper limit set RAM 709 is also addressed by the encoder 706. RAM 709 outputs an upper limit of the addresses in the procedure identified by the procedure determination logic 305. The output of the RAM 709 is sent to the upper limit comparator 717 where it is also compared with the address output by the address generation logic 312. The result of the comparison at 717 is also output to the AND gate 716.

Thus the output of the AND gate 716 indicates whether the local variable address output by the address generation logic 312 is properly within the current procedure's stack frame. The output of 716 is a valid local data bit.

The Local Tag Memory

Each procedure has a local tag table. This tag table contains a want bit and a write/$\overline{read}$ bit. These bits serve the same functions as the respective bits in the global tag memory (see Table I). A separate tag memory is required for each procedure because the same index for a local variable in one procedure refers to a completely different local variable in another procedure. For example, in FIG. 5c the index for the variable x in procedure main is the same as the index for the variable result in procedure add_ab, i.e. −4 in this case.

This set of tag tables can be implemented as a set of physically distinct tag memories or it can be implemented using a segmented memory scheme. The latter method is used in the preferred embodiment so that variable amounts of tag table space can be allocated to different procedures. The segmented scheme cuts up the memory into variable sized chunks in proportion to the size of the stack frame for each procedure. The actual allocation of tag table space in this large pool of memory is done by the debugger software at compile time. For example, in FIG. 5c, procedure main has a stack frame that is 20 bytes long, therefore 20 bytes of the local tag table memory will be allocated to this procedure. If there was a separate tag table memory implemented for each procedure, the maximum size allowed for a stack frame would be limited to the size of the largest individual tag table memory.

In the preferred embodiment, the size of the local tag memory 310 is 128K 4-bit words. This implies that the maximum amount of local data space that can be traced during any one run of the target program is 128K words. With this variable allotment of local tag memory space, the size of any one procedure's stack frame to be traced can be anywhere from 0 to 128K words.

Figure 9:
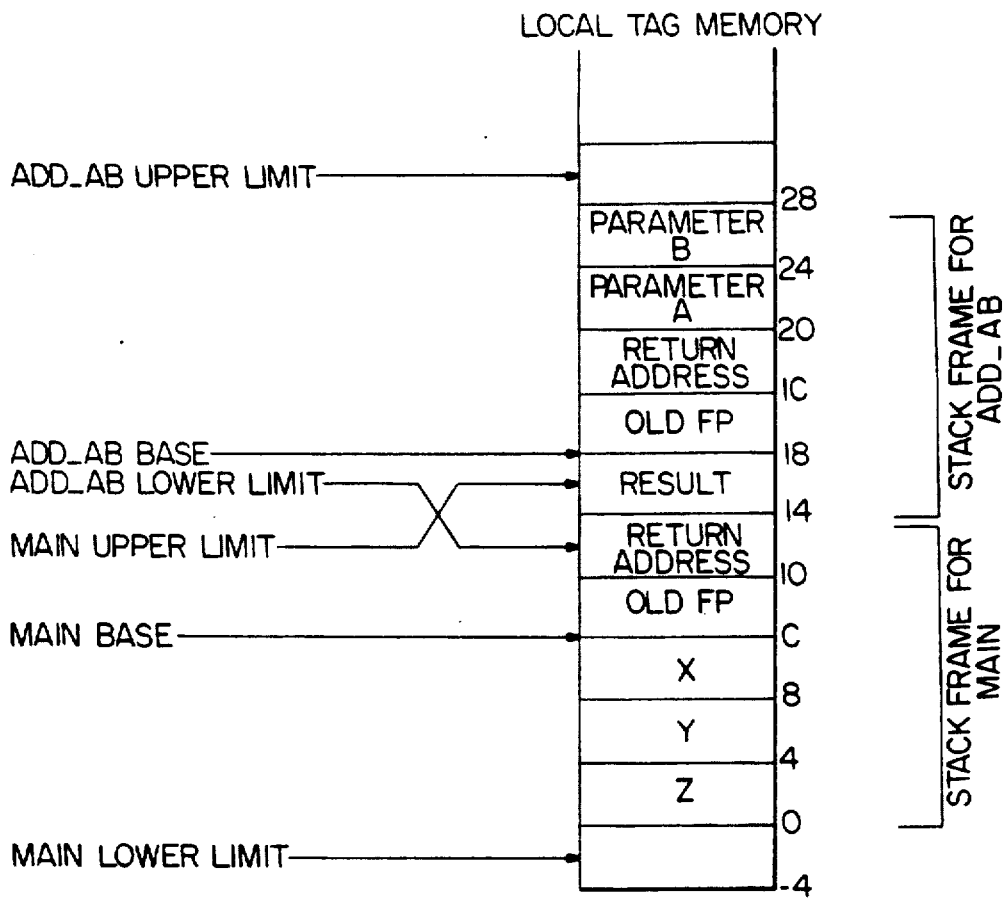

In a segmented memory scheme, a set of base pointers is needed to point to the block of memory allocated for each segment. A set of upper and lower limits is also needed to define the bounds of the segments. This set of base pointers, upper limits, and lower limits is referred to as the set RAM. These RAMS were discussed with reference to FIG. 7, above. FIG. 9 shows a likely segmentation of the local tag table memory for the C program listed in FIG. 5a. The values of the set RAM, 707, 708, and 709 for procedure main then become C, −2, and 16 (hex) for the base pointer, lower limit, and the upper limit, respectively. The lower limit is −2 since the limits point to the outer bounds of the segment. The negative sign is valid in this case since the address computation is done in 2's complement arithmetic. Similarly, the set RAM 707, 708, and 709 values for procedure add_ab are 18, 12, and 30 (hex) for the base, lower and upper limits. The number of segments that can be allocated is 8 in the current hardware implementation. Therefore, there are 8 sets of base pointers, lower limits and upper limits. This set of 24 (3×8=24) values is stored in the set RAM. FIG. 7 shows this set RAM 707, 708 and 709 in the system block diagram.

As can be seen from the above discussion, the debugger must know which segment of memory to use for the currently executing procedure being executed during run-time. The determination of the current executing procedure is done by the procedure determination logic 305 shown in detail in FIG. 6.

As seen from the diagram in FIG. 7, two arithmetic units are involved in computing the address to send to the local tag RAM. The raw address on the pins of the target processor 105 is added to the base (from the output of the base pointer set RAM 707) and the value of the current frame pointer, which is held in the frame pointer register 404, is subtracted from it. For example, assume the 68000 is accessing local variable, result, in procedure add_ab in FIGS. 5a and 5c. The raw address on the pins of the 68000 is therefore FFDC. The value of the current frame pointer is FFE0. The value of the local tag base pointer for this procedure is 18 (shown in FIG. 9). The debugger 107 then performs the following arithmetic operations:

Raw_Address + Base − FP = FFDC + 18 − FFE0 = 14

Address location 14 is where the local tag bits reside in the local tag RAM 310 for this variable, as shown in FIG. 5c.

To show another example, assume that the processor is accessing parameter a in procedure add_ab. The following arithmetic is performed:

Raw Address + Base − FP = FFE8 + 18 − FFE0 = 20

Address location 20 is where the tag bits for parameter a reside in the local tag table memory.

The output of the address generation logic 312 is also compared with the upper and lower limits as shown in FIG. 7 at 715 and 717. The output of the address generation logic 312 must fall within the segment limits, otherwise the reverse indexing done by the debugger would create a hit in another procedure's local tag table memory segment. The output of these comparators 715 and 717 is a qualifier which indicates the validity of the tag bits coming out of the local tag RAM 310. If an address to the local tag RAM 310 is outside of the limits, then the 68000 is not accessing a variable or parameter local to the current procedure. In this case, the 68000 is most likely accessing a global variable, a local variable, or a local variable in a stack frame below the current one. Since the language C allows the passing of pointers to procedures, a case may occur where the current procedure accesses variables below the current stack frame. Tracing data accesses in stack frames outside the current one is not shown in the preferred embodiment.

Figure 1:
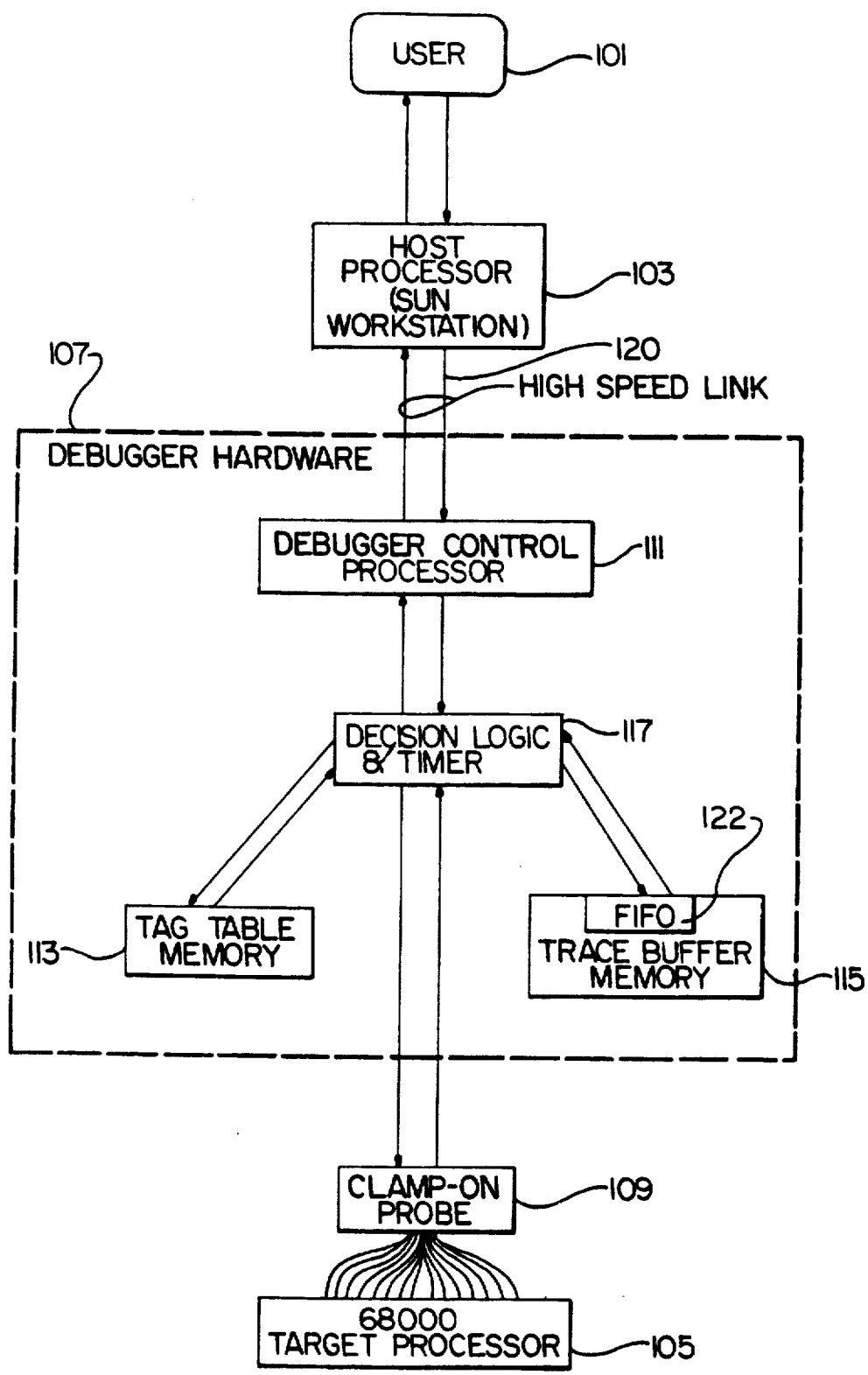
FIG. 1 is a block diagram of a prior art system.

The final results of these arithmetic operations and boundary checks are the tag bits, the address from the arithmetic unit, and the validation signal. The tag bits and the validation signal are sent to the decision logic block 117 shown in FIG. 1. The address resulting from the arithmetic units is sent to the trace buffer memory 115 if the data access performed by the 68000 is a valid local variable access and if the tag bits indicate that this variable is to be traced. From this address, which is unique for each selected local datum, the debugger software can reconstruct which procedure to which the local datum belongs and the offset of this datum within the stack frame. From this information and the symbol table, the name of the local variable can be determined.

Host Software

In order for the debugger 107 to run, certain software must be resident on the host computer 103 and the control processor 111. This software takes user instructions and source code and converts them into a form that is usable by the debugger 107 and the target processor 105. This software must also take information from the trace buffer memory 115 and use it to display trace results for the user 101. Appendix C, available in the patented file, contains source code listings for certain important parts of this software.

Figure 10:
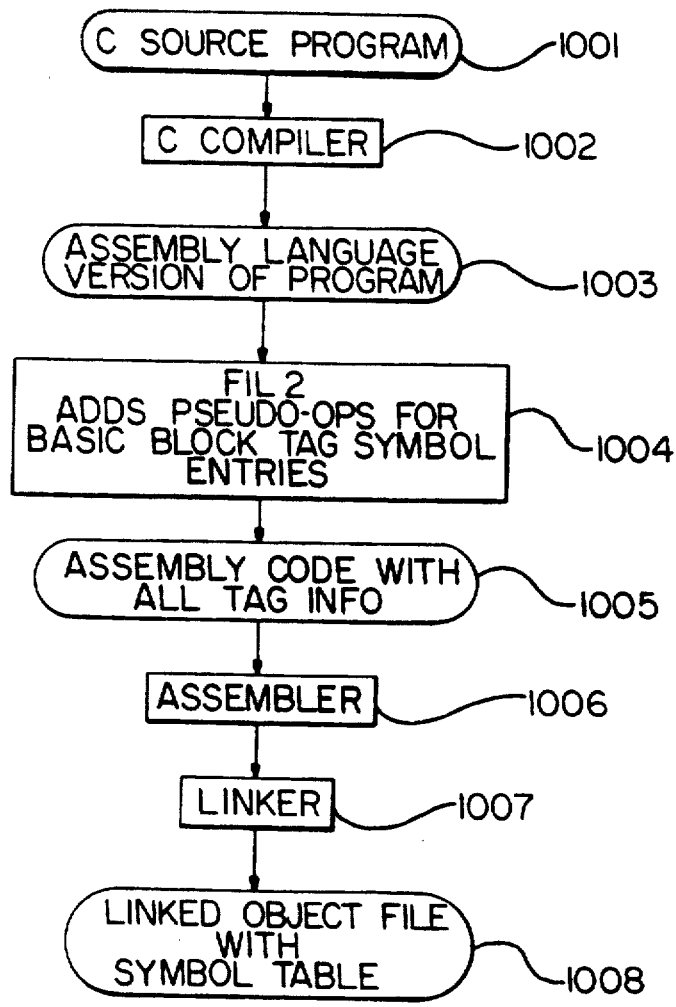
FIG. 10 is an overview of software which produces from a source code program a linked object file with a symbol table.

FIG. 10 shows an overview of the software which converts user source code into a form usable by the target processor 105 and the debugger 107.

One piece of software which must be present on the Host is a compiler 1002. In the preferred embodiment this is the commercially available Sun Unix C compiler. The compiler 1002 converts user source code programs 1001 into assembly code 1003. This assembly code output 1003 contains assembler directives ("pseudo-ops") that cause symbol table entries 1008 to be generated by the assembler 1006 and the linker 1007 for statements, and global, static, and local variables. These symbol table entries 1008 are sufficient for computing data and statement tags. It is noted that the assembler and linker are commercially available from SUN with the preferred C compiler. The assembler is described in Sun Microsystems, Inc., *Assembler Language Reference Manual for the Sun Workstation*.

Ideally, basic block symbol table directives could also be produced by the compiler. However, to avoid changing the compiler, basic block symbol table directives are added to the assembly code 1003 by a separate program called "Fil2" 1004. Fil2 1004 takes as input the assembly language 1003 and inserts basic block symbol table directives after the appropriate instructions, e.g. labels, branches, branches to subroutines, and returns to subroutines. Source code for Fil2 1004 appears in appendix C, available in the patented file, at pages C-1 and C-2. Fil2 1004 is written in "awk", a Unix string processing language.

Figure 11A:
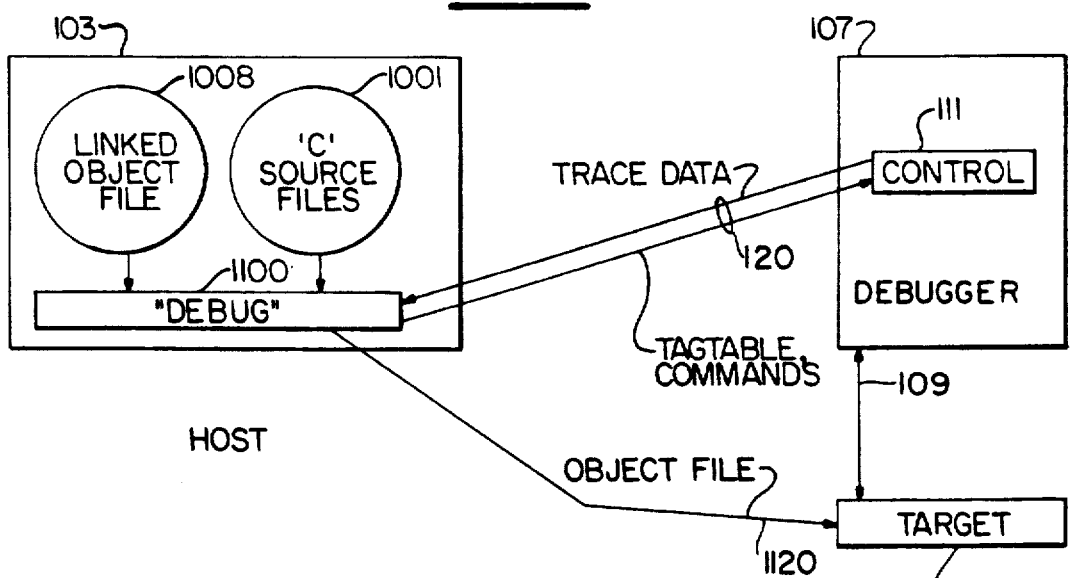
FIG. 11a gives an overview of the data passed between the host 103, the debugger 107, and the target 105.

FIG. 11a gives an overview of the data passed between the host 103, the debugger 107, and the target 105. FIG. 11a uses reference numerals from previous figures, where the reference numerals refer to parts explained earlier. The host 103 sends tag tables and commands to the control processor 111 of the debugger 107. The host 103 also sends an object file 1008 to the target 105. The host 103 receives trace data from the debugger 107. Within the host 103, inputs and outputs to the debugger 107 are controlled by a program called "Debug" 1100. Debug will be explained with reference to FIGS. 11b, and 12a-12c, below. Debug 1100 uses the linked object file 1008 and the "C" source files 1001 discussed earlier with respect to FIG. 10.

Figure 11B:
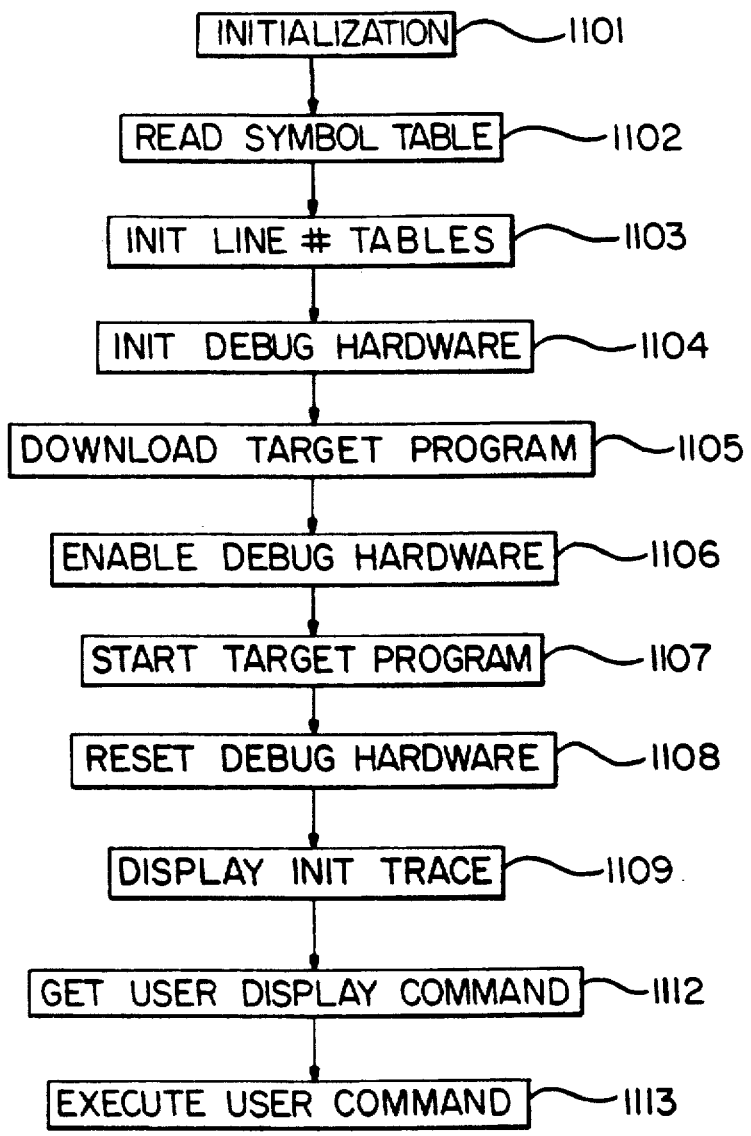
FIG. 11b is an overview of software which interacts with the user of the debugger to get a selection of items to be traced, initiate the trace and give trace output.

Debug 1100 is the user interface to the debugging system and is illustrated in FIG. 11b. After the steps of FIG. 10 are completed, the user 101 invokes debug. At initialization 1101, Debug could accept commands from the user which indicate what to trace. For the sake of clarity, actual commands for accepting the user's selection of variables have been omitted. After initialization 1101, Debug reads the symbol table from the object file 1008 at box 1102. Debug then: computes the appropriate tags 1104; initializes the debugger 107 via messages at box 1104; downloads the object file 1008 to the target processor 105 at box 1105; enables the debugger 107 at box 1106, and starts the program to be traced on the target processor 105 at box 1107. When the user 101 wishes to stop tracing, he or she indicates this to Debug. Debug then sends a message at 1108 to the debugger 107 to halt the program on the target processor 105 and disable tracing. At box 1109, Debug then requests trace data from the debugger 107 and displays source code of the program to be traced with a cursor showing the first basic block executed. Debug then accepts at 1110, 1112, and 1113 interactive commands from the user to display additional basic blocks executed along with the values of selected global, static, and automatic variables. The source statements of a basic block are pointed to by a cursor labeled by time (in microseconds) relative to the beginning of program execution.

Figure 12A:
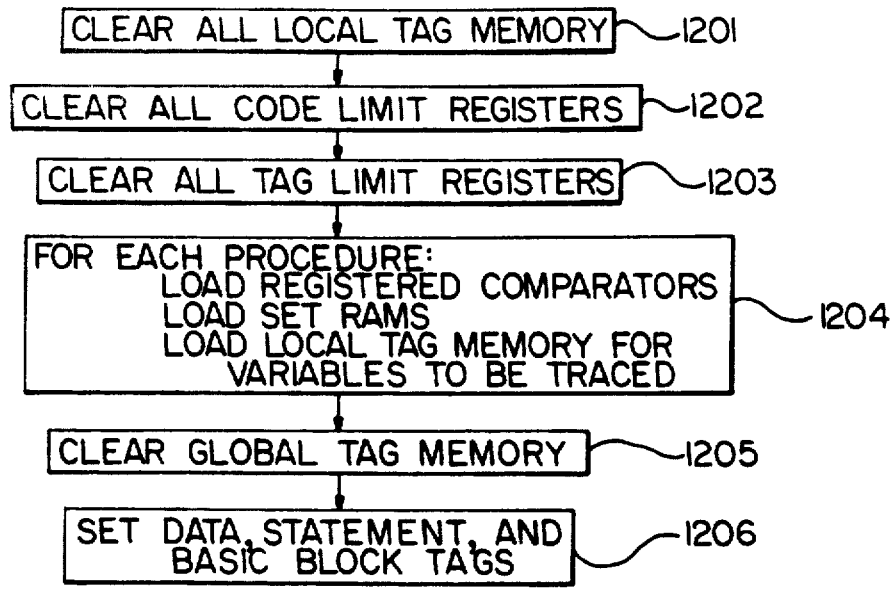
FIG. 12a is an expansion of box 1104 of FIG. 11b.

FIG. 12a is an expansion of box 1104 of FIG. 11b, and shows the steps necessary to initialization of the debugger 107. The first step 1201 is to clear the local tag memory 310. Then, at 1202, the registered comparators 601, 602, 603, 604, 605, 606, 607, and 608 of the procedure determination logic 305 are cleared. Then the tag limit RAMs 707, 708, and 709 are cleared at 1203. Then, at 1204, Debug puts appropriate values, the registered comparators 601, 602, 603, 604, 605, 606, 607, and 608, in the set RAMS 707, 708, and 709, and in the local tag memory 301, that are required for a particular debug run. At 1205, the global tag memory 113 is cleared. At box 1206, appropriate values are loaded into the global tag memory 113.

Figures 12B, 12C:
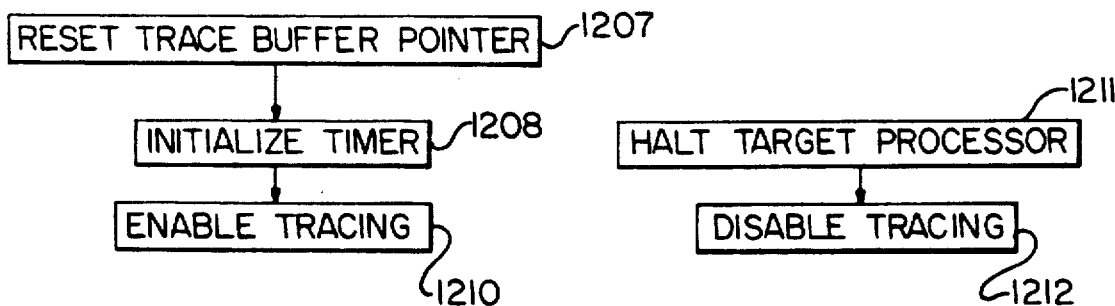
FIG. 12b is an expansion of box 1106 of FIG. 11b.
FIG. 12c is an expansion of box 1108 of FIG. 11b.

FIG. 12b is an expansion of box 1106 of FIG. 11b. In order to enable the debugger 107, the following steps occur: at 1207, the pointer to the trace buffer 115 is reset; at 1208, the timer 117 is initialized; and at 1210, tracing is enabled.

FIG. 12c is an expansion of box 1108 of FIG. 11b. In order to reset the debugger 107, the following steps are done: at 1211, the target processor 105 is halted; and at 1212, tracing is disabled.

Examples of output of Debug are given in Appendix B, available in the patented file. Source code for Debug is given in Appendix C, available in the patented file, at pages c-3 through c-18.

Software in Debugger 107

Certain software resides in the debugger control processor 111 in order to control the debugger 107. The part of the software which deals with local data tracing is called "LocalMemOps". This software initializes the local tag memory 310, the registered comparators 601–608, and the base and limit set RAMS 707, 708, and 709. LocalMemOps is called by the main loop of the control software after decoding an appropriate message sent by Debug. Source code for LocalMemOps appears on pages c-19 through c-22 of Appendix C. Additional software used by the debugger control processor 111 also appears in Appendix C. Appendix C is available in the patented file.

We claim:

1. Apparatus for aiding in debugging of real-time programs executing on a target processor, which programs do not contain special trace instructions, comprising:
   a. means for capturing inputs to and outputs from the target processor; and
   b. means for real-time tracing of values of at least one local variable referenced in one of the programs, using the inputs to and outputs from the target processor, during a process context switch on the target processor, which process context switch involves the at least one local variable.

2. The apparatus of claim 1 wherein the inputs to and outputs from the target processor comprise address, data, and status signals appearing on pins of the target processor.

3. The apparatus of claim 1 wherein the capturing means comprises a clamp for placing over a chip which contains the target processor, the clamp including a plurality of inputs for coupling with respective pins of the chip and reading data therefrom substantially without disturbing the operations of the target processor.

4. The apparatus of claim 1 wherein the means for tracing comprises means for deducing a stack frame pointer of the program from the inputs and outputs.

5. The apparatus of claim 4 wherein the means for deducing comprises means for recognizing standard machine instructions of the target processor.

6. The apparatus of claim 5 wherein the standard machine instructions comprise an instruction which restores, from a memory coupled with the target processor, a plurality of register values one of which values is the stack frame pointer.

7. The apparatus of claim 6 wherein the the instruction is a moveml-type instruction.

8. The apparatus of claim 5 wherein the standard machine instructions comprise an instruction which restores from a memory coupled with the target processor a register value which is the stack frame pointer.

9. The apparatus of claim 8 wherein the instruction is a movel-type instruction.

10. The apparatus of claim 5 wherein the standard machine instructions comprise an instruction which creates a stack frame for storing local data belonging to a local procedure.

11. The apparatus of claim 10 wherein the instruction is a link-type instruction.

12. The apparatus of claim 5 wherein the standard machine instructions comprise a second instruction which removes the stack frame.

13. The apparatus of claim 12 wherein the second instruction is an unlink-type instruction.

14. The apparatus of claim 1 wherein:
   a. the inputs t and outputs from the target processor comprise address, data, and status signals appearing on pins of the target processor; and
   b. the tracing means comprises:
      i. a local tag memory for storing an image of tag information which represents a selection by a user of which local data to trace;
      ii. means for deducing a stack frame pointer of the program from the address, data and status signals;

iii. means for storing a base address corresponding to a location of tag information in the local tag memory;
iv. means for locating the tag information within the local tag memory using the base address and an offset which corresponds to a difference between the stack frame pointer and an address captured by the capturing means.

15. The apparatus of claim 14 wherein:
a. the program comprises a plurality of procedures, each call to one of the procedures corresponding to a respective stack frame;
b. the image represents the selection by the user of local data to trace from more than one of the procedures, whereby the local tag memory contains a plurality of sets of tag information relating to respective procedure stack frames;
c. the means for storing the base address stores a plurality of base addresses one for each set of tag information;
d. the means for locating uses as the base address one of the start addresses which corresponds to a procedure which includes the address captured by the capturing means,
whereby parallel means for locating for each of the procedures of the program are eliminated.

16. The apparatus of claim 1 comprising means or real-time ignoring machine instructions which are prefetched and not executed.

17. The apparatus of claim 16 wherein the ignoring means comprises
a global tag memory;
means for setting a basic block bit in the global tab memory corresponding to each instruction in an object code representation of the program; and
means for sensing a value of a basic block bit corresponding to an instruction after a prefetched instruction to determine whether the prefetched instruction should be ignored.

18. The apparatus of claim 1 comprising a host processor which comprises
a. means for storing source code for the program;
b. means for compiling the source code, the compiling means supplying an object code representation of the program and a symbol table; and
c. means for downloading the object code representation into the target processor.

19. The apparatus of claim 18 wherein the symbol table comprises:
a. start and end addresses of procedures of the program;
b. offsets of local data locations; and
c. addresses of instructions which begin basic blocks.

20. The apparatus of claim 19 wherein the host processor further comprises:
a. means for accepting a selection by a user of local data in the program to be traced; and
b. means for displaying trace results.

21. The apparatus of claim 20 wherein the selection further comprises an indication of whether the local data is to be traced on write references only or on read and write references.

22. The apparatus of claim 20 wherein the host processor comprises: means for deriving from the symbol table a set of procedure code bounds which comprises the respective start and end addresses of the procedures in which local data are to be traced.

23. The apparatus of claim 22 wherein the host processor further comprises means for deriving from the symbol table, an image of contents of a global memory, the image comprising basic block bits that are set to indicate instructions that begin basic blocks.

24. The apparatus of claim 23 wherein
I. the tracing means comprises:
a. input means for receiving data derived from the symbol table and the selection from the host processor;
b. second means for capturing a frame pointer of the program from the inputs and outputs of the target processor, by decoding op-codes of the program, which op-codes are captured by the means for capturing;
c. a local tag table memory for storing the selection, the local tag table memory having addressable locations and an output for supplying an indication of whether a particular local datum is part of the selection; and
d. logic means for determining, from:
i) the set of procedure code bounds;
ii) the frame pointer, and
iii) address and data information appearing in the inputs and outputs of the target processor, whether control in the target processor is currently in a given procedure and for specifying a given one of the locations in the local tag table memory which corresponds to the local datum within the given procedure; and
II. the capturing means provides values of the local data in the selection under the control of the local tag table memory.

25. The apparatus of claim 24 wherein the determining means comprises a plurality of pairs of registered comparators, each pair of registered comparators containing respective upper and lower procedure code bounds, the registered comparators being loaded from the set of procedure code bounds.

26. The apparatus of claim 24 wherein the second capturing means comprises:
a. input means for receiving a plurality of flags indicating:
i. whether an instruction which affects the stack frame pointer is present on a data bus of the target processor (link, unlink, movem);
ii. which register of the target processor contains the frame pointer ($S_{10}$, $S_{11}$, $S_{12}$);
iii. whether signals on the data bus represent an instruction (FCO);
iv. whether an instruction fetch appearing on the pins is part of a prefetch only; and
v. which fetch in a move multiple instruction is for the frame pointer register (S3, S2, S1, S0);
b. logic for steering signals captured from the data bus and an address bus of the target processor, the steering logic having
i. an input for receiving signals captured from the data and addresses buses; and
ii. an output;
c. a frame pointer register, having
i. an input at the output of the steering logic, and
ii. a control input, the frame pointer register loading a value of the frame pointer from the steering logic under control of a signal received at the control input; and
d. a state machine for converting the plurality of flags into a second plurality of flags indicating whether:

i. the steering logic should provide at its output, signals from the address bus;

ii. the steering logic should provide at its output, signals from the data bus;

iii. to load the frame pointer register from the steering logic; and iv. the frame pointer register contains a valid frame pointer.

27. Apparatus for aiding in debugging of a real-time program executing on a target processor, the program comprising a plurality of procedures, each call to one of the procedures corresponding to a respective stack frame, the apparatus comprising:

a. means for capturing inputs to and outputs from the target processor;

b. means (120) for receiving: a selection by a user of local data to be traced, the local data to be traced being from a plurality of procedures; and data derived from a symbol table generated on a host processor as a result of compilation of a source-code version of the program;

c. second means for capturing a frame pointer of the program from the inputs and outputs from the target processor, by decoding op-codes of the program, which op codes are captured by the means for capturing;

d. a local tag table memory for storing the selection, the local tag table memory having addressable locations and an output for supplying an indication of whether a particular local datum is part of the selection, the local tag memory containing a plurality of sets of tag information relating to respective procedure stack frames; and e. logic means for specifying, based on the inputs and outputs, the data derived from the symbol table, and the frame pointer, a given one of the locations in the local tag table memory which corresponds to the local datum within the given procedure, using a segmented addressing scheme;

wherein the capturing means provides values of the local data in the selection under the control of the local tag table memory.

28. A method for tracing local data used in a high level language program which runs on a target processor, the method comprising the steps of:

a) capturing signals input to and output from the target processor, which captured signals include addresses, data, status signals, and contents of a program counter of the target processor;

b) continuously sampling the contents of the program counter;

c) testing whether the contents of the program counter fall within a set of procedure code bounds;

d) decoding op codes of instructions being executed on the target processor, based on the captured signals;

e) deducing a stack frame pointer based on decoded op codes which are from the set of op codes which indicate both procedure calls and process context switches, at least one of the decoded op codes indicating a process context switch;

f) when the results of the testing step are positive:
i) identifying the local data based on an offset from the stack frame pointer;
ii) indexing a local tag memory associated with the contents of the program counter using the offset;
iii) determining from the indexed tag memory that the local data is to be traced; and
iv) capturing the local data.

29. The method of claim 28 further comprising, after the decoding step, the step of a) if the decoded op code is one which can change the stack frame pointer, checking whether a corresponding instruction is being executed by checking a tag bit of a next instruction; and b) if the corresponding instruction is not being executed, ignoring the corresponding instruction as prefetched and not executed.

30. The method of claim 29 further comprising, after the checking step, the step of:

a) if the decoded op code is a movem, further decoding the corresponding instruction to determine if the frame pointer is modified.

* * * * *